United States Patent
Kurtz et al.

(10) Patent No.: US 8,290,208 B2
(45) Date of Patent: Oct. 16, 2012

(54) ENHANCED SAFETY DURING LASER PROJECTION

(75) Inventors: Andrew F. Kurtz, Macedon, NY (US); Andrew C. Blose, Penfield, NY (US); Michael A. Marcus, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 949 days.

(21) Appl. No.: 12/352,030

(22) Filed: Jan. 12, 2009

(65) Prior Publication Data

US 2010/0177929 A1    Jul. 15, 2010

(51) Int. Cl.
*G06K 9/00* (2006.01)
*G06K 9/34* (2006.01)

(52) U.S. Cl. ........................ 382/103; 382/173
(58) Field of Classification Search ............... 382/103, 382/173; 353/122
See application file for complete search history.

(56) References Cited

U.S. PATENT DOCUMENTS

| | | |
|---|---|---|
| 4,884,275 A | 11/1989 | Simms |
| 5,117,221 A | 5/1992 | Mishica, Jr. |
| 6,002,505 A * | 12/1999 | Kraenert et al. ........ 359/196.1 |
| 6,361,173 B1 | 3/2002 | Vlahos et al. |
| 6,460,999 B1 | 10/2002 | Suzuki |
| 6,575,581 B2 | 6/2003 | Tsurushima |
| 6,661,820 B1 | 12/2003 | Camilleri et al. |
| 6,789,903 B2 | 9/2004 | Parker et al. |
| 6,796,656 B1 | 9/2004 | Dadourian |
| 6,984,039 B2 | 1/2006 | Agostinelli |
| 7,018,055 B2 | 3/2006 | Suzuki |
| 7,030,353 B2 | 4/2006 | Stern et al. |
| 7,144,117 B2 | 12/2006 | Kojima |
| 7,210,786 B2 | 5/2007 | Tamura et al. |
| 7,364,309 B2 | 4/2008 | Sugawara et al. |
| 2005/0024208 A1* | 2/2005 | Maki et al. .......... 340/545.3 |
| 2005/0117132 A1* | 6/2005 | Agostinelli .......... 353/122 |
| 2005/0242185 A1 | 11/2005 | Winkler et al. |
| 2006/0058694 A1 | 3/2006 | Clark et al. |
| 2006/0170871 A1 | 8/2006 | Dietz et al. |

FOREIGN PATENT DOCUMENTS

WO    2006/078877    7/2006

OTHER PUBLICATIONS

A. L. Yuille, et al., "Feature extraction from faces using deformable templates", International Journal of Computer Vision, 1992, vol. 8, pp. 99-111.
T. F. Cootes, et al., "Active Shape Models—Their Training and Application", Computer Vision and Image Understanding, 1995, vol. 61, No. 1, pp. 38-59.
S. D. Cotton, et al., "Developing a predictive model of human skin colouring", SPIE, vol. 2708, 1996, pp. 814-825.
D. A. Forsyth, et al, "Finding People and Animals by Guided Assembly", Conference on Image Processing, 1997, vol. 3, pp. 5-8.

(Continued)

*Primary Examiner* — Vu Le
*Assistant Examiner* — Amara Abdi
(74) *Attorney, Agent, or Firm* — Kevin E. Spaulding

(57) ABSTRACT

The present invention is directed to systems and methods that provide enhanced eye safety for image projection systems. In particular, the instant invention provides enhanced eye safety for long throw laser projection systems.

26 Claims, 18 Drawing Sheets

OTHER PUBLICATIONS

H. Ruser, et al., "Highly sensitive motion detection with a combined microwave-ultrasonic sensor", Sensors and Actuators, vol. A 67, 1998, pp. 125-132.

J. B. Dowdall, et al., "Face Detection in the Near-IR Spectrum", Proc., SPIE, vol. 5074, 2003, pp. 745-756.

D. Hoiem, et al., "Putting Objects in Perspective", IEEE Proc. Vision and Pattern Recognition (CVPR), 2006, pp. 2137-2144.

Y. Yacoob, et al., "Detection, Analysis and Matching of Hair", IEEE International Conference on Computer Vision (ICCV '05), vol. 28, 2006, pp. 1164-1169.

* cited by examiner

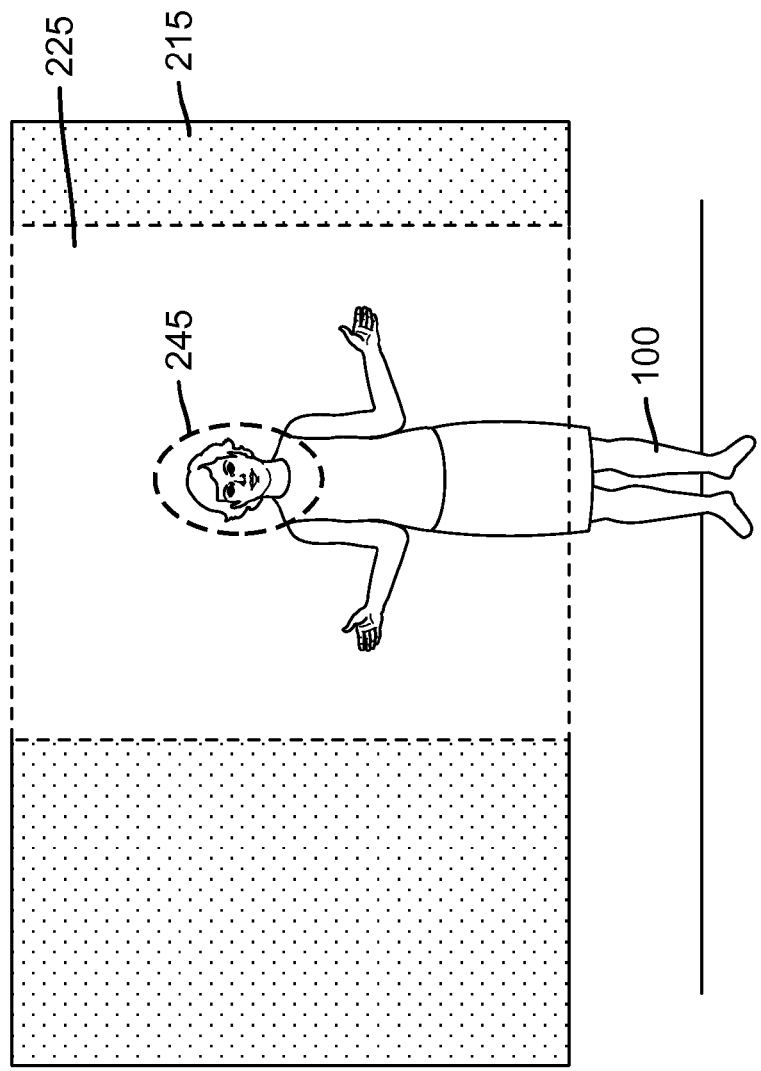

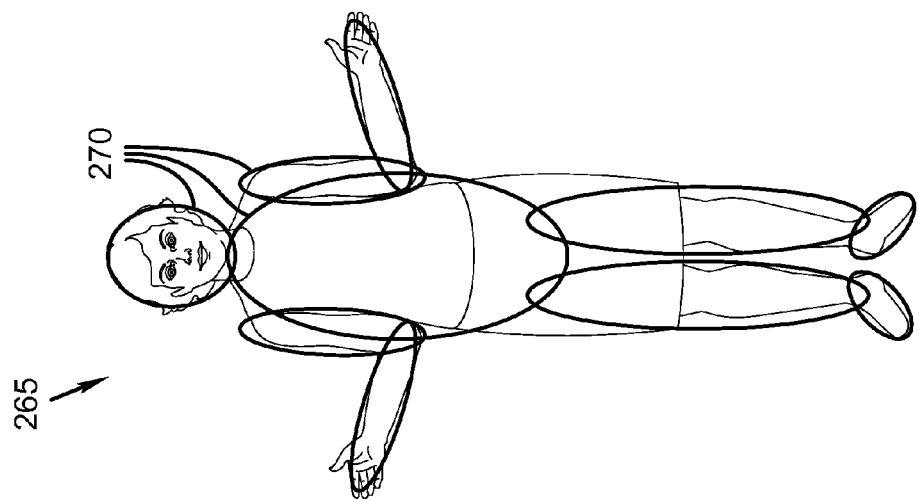
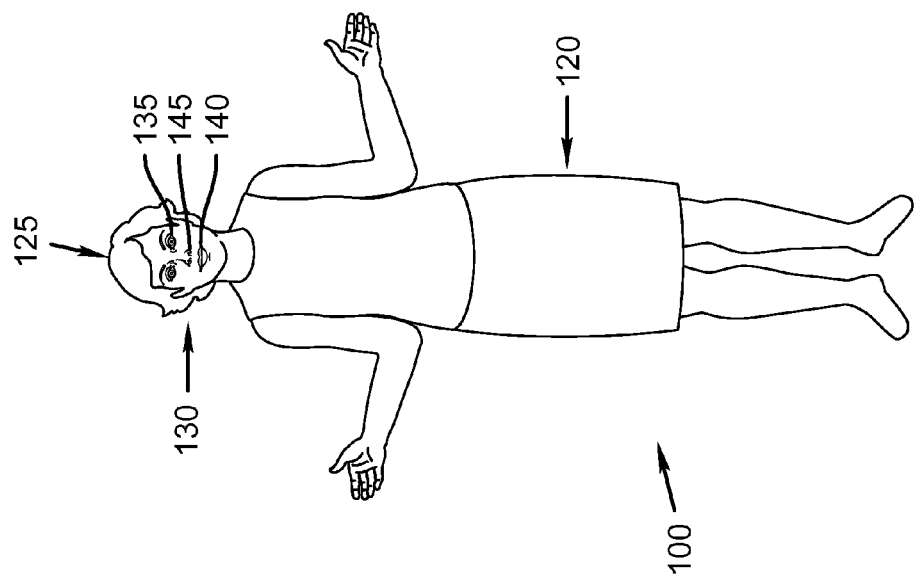
FIG. 6A
FIG. 6B

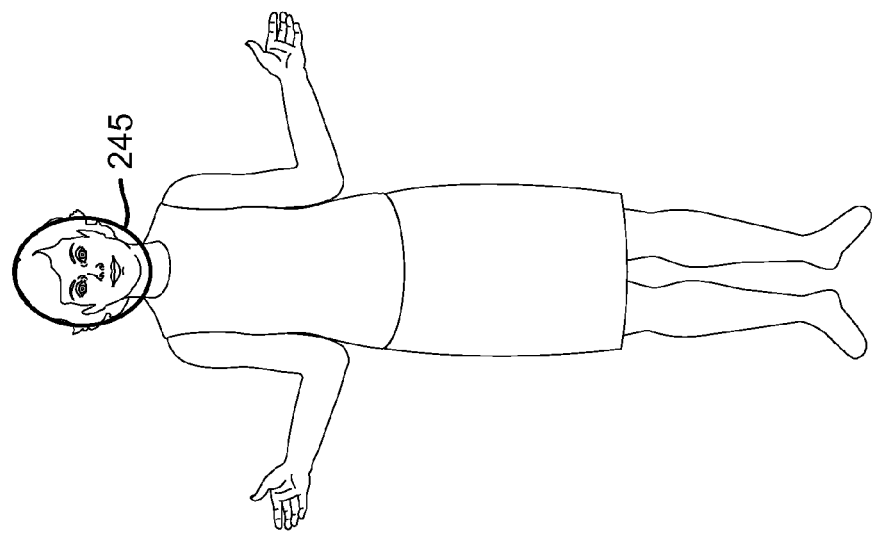
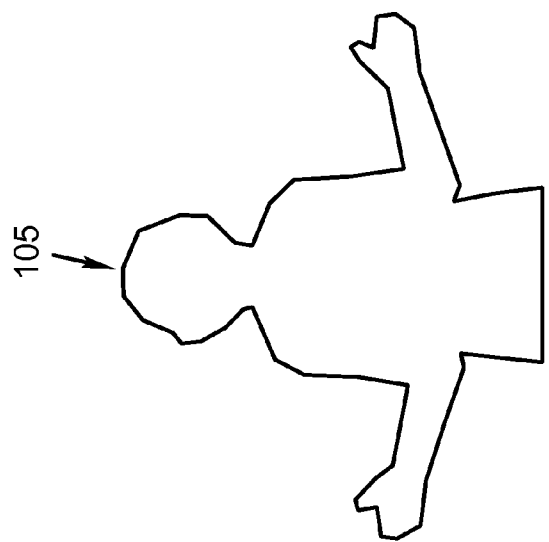
FIG. 6D
FIG. 6C

ENHANCED SAFETY DURING LASER PROJECTION

CROSS-REFERENCE TO RELATED APPLICATION

This application is related to U.S. Application Publication No. 2010/0177968 published Jul. 15, 2010, titled "Detection of Animate or Inanimate Objects", by Fry and Kurtz.

FIELD OF THE INVENTION

The present invention relates to providing enhanced eye safety for image projection systems, and particularly for laser based image projection systems.

BACKGROUND OF THE INVENTION

At present, laser systems for projecting images to an audience still occupy niche markets in planetariums, nightclubs, and special venues (Niagara Falls, for example), although pocket laser projectors for use with laptop computers and cell-phones are now emerging. Generally, widespread adoption of laser projection has been delayed by the lack of compact, low-cost, high-power RGB lasers. However, issues related to eye safety have also lingered in the background, preventing wider adoption of existing technologies.

Many laser systems, projectors included, provide safety interlocks that shut down the lasers when the system enclosure is compromised. Other systems provide pro-active safety controls that shut the system down when internal components fail. For example, U.S. Pat. No. 4,613,201 to Shortle et al. describes a scanning laser projection system that shutters the laser beams when malfunctions of the scanner (a micro-mirror, AOM, or galvo) are detected. As another example, U.S. Pat. No. 6,661,820 to Camilleri et al., uses internal controls to provide eye safe laser illumination for a stop-action laser-illuminated photography system. In particular, Camilleri '820 provides a fault detection scheme to monitor the operation of a laser projection system relative to internal electronic or software failures that could cause the system to operate unsafely. Camilleri '820 also includes a laser control system, that allows peak laser power, average laser power, and laser pulse parameters to be controlled, relative to a predetermined and appropriate safety standard that has been provided for a given application.

Laser safety can also be managed for beams traveling in free space outside an enclosure. As a first example, U.S. Pat. No. 4,884,275 to Simms provides for a portable IR laser illuminator that includes a series of infrared light responsive photoelectric detectors arrayed around the exit aperture of the light source. These detectors can receive a portion of any light reflected from the laser light source by an object intruding into the laser beam path. The detectors are intended to be particularly responsive to reflected light directed from within a danger zone of a few inches from the exit aperture. When incident light corresponding to the frequency of the laser light source is detected, a safety switch turns off the power supply to the laser light source In the case of front-side projection systems, efforts have been made to manage at-risk situations related to eye safety in the viewing environment. In particular, projection systems that provide active detection of intruding objects or people in the beam path beyond the projector enclosure (or housing), and then respond with corrective actions to reduce or re-direct the light output have been described. As an example, U.S. Pat. No. 6,361,173 to Vlahos et al., describes an image projection system that includes an IR light source and an IR sensitive imaging camera that are both directed towards the screen. When a subject (person) enters the projection beam, the subject's infrared reflection is likely to be higher or lower than the uniform infrared luminance level of the projection screen. The change in the IR reflection signal is correlated with projected image pixels. Then, using a digital matte, video program signals to the pixel addresses associated with the subject location are changed so as to reduce the corresponding light exposure. While Vlahos '173 is motivated to reduce the annoyance of the subject (a presenter addressing an audience, for example) to being blinded by the projection light, rather than by eye safety concerns, the controlled inhibition (<5% full intensity) of the projection light on the detected subject provides much the same effect.

An associated patent, U.S. Pat. No. 6,789,903 to Parker et al., improves upon Vlahos '173 by using structured or patterned IR illumination. Structured or patterned IR illumination is useful in locating an obstruction, and also in isolating patterns from the ambient illumination or patterned clothing worn by the presenter, that can otherwise confuse interpretation of the detected IR signals. An imaged pattern indicative of an obstruction can be compared to a reference frame pattern to generate differential signals that locate the obstruction. Again, mattes, which represent modified portions of an image, can be generated for pixels associated with an obstruction, thereby preventing illumination of the obstruction. Another related patent, U.S. Pat. No. 6,796,656, to Dadourian et al., uses a similar method, except that the screen is patterned with high gain retro-reflective beads that direct bright IR light to the IR camera, thereby providing high signal levels useful in generating mattes to inhibit portions of the projected image.

In a similar fashion to Parker '903, U.S. Pat. No. 7,210,786 to Tamura, et al., compares a patterned IR light reference image taken of the image projection area (without obstructions) to images captured during system operation with the same patterned IR light. In particular, image comparison and object detection algorithms locate image differences, thereby locating obstructions. Image data is then blanked using oversized image masks, providing eye safety with margin for potential motion of the person.

Front projection laser systems with perimeter monitoring to anticipate incoming people or object have also been described. As one example, U.S. Pat. No. 6,002,505 by Kraenert et al., uses an IR laser to scan beyond the extent of the projected visible image. IR sensors can detect changes in light reflection caused by intruding objects, resulting in the safety circuit triggering system operation into a safer mode of operation. Likewise, U.S. Pat. No. 6,575,581 to Tsurushima projects IR light onto the screen including to a perimeter area larger than the projected image area. Reflected light from the screen and from any incoming obstacles is detected and analyzed, thereby identifying and locating any changes (reductions) in the reflected light intensity caused by the obstruction.

By comparison, U.S. Pat. No. 7,144,117 to Kojima et al., describes a scanning laser projection system which scans an IR detection beam within the image projection area, but in advance of the scanned image light. In particular, Kojima '117 describes a scanning laser projector in which color images are created using color channels comprising an appropriate laser (R, G, or B) and an associated grating light valve (GLV) modulator array. The color beams are combined and scanned across the screen using a rotating scan mirror. In parallel, a second IR laser beam source is scanned across the screen by the same scan mirror, but in advance of the image light. An IR sensitive camera can then detect intruding objects as changes in the reflected light signal. When an object is detected, control signals are generated to reduce the light intensity of the RGB lasers that provide the image light to (human) eye safe levels.

In another method, commonly assigned U.S. Pat. No. 6,984,039 to J. Agostinelli describes a scanning laser projection system that has a camera that captures screen images, nominally of the image provided by the projector itself. The input image, which is known, is compared to the projected image captured by the camera. Image analysis can then find differences indicative of the presence of an obstruction in the projection space near the screen. The processor then determines modifications to the projection image data that can be applied, such that scan lines can be modified, or "blanked", so that no light is projected over the obstructed area. As Agostinelli '039 intends to provide conformal blanking around the object, the image differencing analysis essentially provides silhouettes or outlines of the obstructing object. The silhouette positions can be tracked in time as the object moves, so that the image blanking can be provided in the direction of object movement, while image content can again be projected into the vacated space. This is known as image filling.

Agostinelli '039 also teaches that the camera can be offset from the projection optical axis, so that the shadow cast by the object, relative to the projected light, can be detected. As the shadow contrast is high relative to the projected light, large image differences are provided, making object detection easier. Additionally, Agostinelli '039 teaches that facial feature detection, eye location, and red-eye detection algorithms can all be used to locate eye regions, so that projected light can be specifically blocked in the eye region areas.

While the prior art discussed above describes laser safety features in various ways, it does not distinguish between safety needs near the projector, compared to those proximate to the screen. In particular, close to the projector, where energy levels are high and likely in excess of published safety standards for exposure, complete blanking of the projected light given the presence of an obstruction is warranted. Indeed, highly robust detection mechanisms with miniscule failure rates are required. Even though the obstructing object itself may not be a face and eye, a highly reflective surface in the beam path could direct an intense beam into an eye that is otherwise located outside of the projection light path. Thus, the detection means need to be universally successful, regardless of the nature of the object.

On the other hand, at locations proximate to the screen, energy levels typically are actually reduced to safer levels. For example, in the space immediately in front of the screen, the laser safety levels of a projector may be Class 3R (IEC Laser Classification), which is considered marginally unsafe for intra-beam viewing. In a Class 3R area, it is assumed that an observer can react to eye exposure via the eye aversion response, thereby avoiding damage. This suggests that in the near screen region, where energy levels are nominally safe, safety screening could be subtler than has been suggested. Notably, in the laser safety prior art discussed above, positive detection of objects near the screen typically results in large portions of the image being blanked. If the object is innocuous and inanimate, such blanking may irritate viewers. Thus, by comparison, it can be desirable to discriminate between animate (alive) and inanimate (not-alive) objects, and in the latter case, allow projection to continue without interruption.

A more finessed or subtle screening can also be directed to eye-based screening methods, using eye detection and tracking algorithms, for example. However, careful consideration is required for such approaches. It is observed that the eye safety standards are generally written anticipating that potential eye damage will be reduced in part by the eye aversion response to intense light. However, human (or animal) behaviors, common in a residential environment, may lead to potentially unsafe situations not fully anticipated by the standards. As an example, if an animate being deliberately looks back into the projector, over-riding the eye aversion response, eye damage may still occur. As another example, eye safety standards may not also fully account for sudden eye exposure to laser light of a (scotopically or mesopically) dark-adapted individual, whose eyes have heightened bio-chemical sensitivity as well as large pupil dilation. Additionally, in a residential environment, the exposed animate being can easily be an animal, such as a common pet like a cat or a dog. Cat eyes, as an example, have ~6× greater light sensitivity than human eyes. However, the laser safety standards are human centric, and do not take animal eyes into account. Thus, while current laser safety standards may not address such situations, eye damage may potentially occur near the screen, despite that area being rated as nominally safe.

Given these concerns, there are legitimate reasons to specifically target projection safety screening and projection image blanking towards animate objects generally, and then particularly to the likely head or facial regions thereon. This is true whether entire lines of image data are blanked or the image blanking is more conformal to the body or head region of the object. In general, robust eye safety management needs greater discrimination than taught in the prior art. Face detection algorithms, red-eye detection algorithms, or body shape detection algorithms can all be insufficient. The potential of complex body shapes, obscuration by clothing, the presence of animals, and abrupt motion, all complicate eye safety management. In practice, robust eye safety management should emphasize detection of animate objects, detection of candidate head regions using multiple methods, and prioritization of projection light blanking to animate objects and candidate head regions. As the prior art has neglected these issues, and has not developed solutions thereto, opportunities remain for improved eye safety management with regards to image projection systems, including laser projection systems.

SUMMARY OF THE INVENTION

The present invention is directed to systems and methods that provide enhanced eye safety for image projection systems.

In accordance with one aspect of the present invention there is provided a method for providing improved eye safety while operating an image projection system including the steps of: operating an image projection system that generates a modulated light beam which forms images on a display surface, monitoring an area in front of the display surface, and at least inclusive of the display surface, with an image capture device, analyzing images acquired by the image capture device to locate subjects that can obstruct a portion of the modulated light beam prior to the display surface, blanking image projection to at least the head blanking region by substantially reducing the light levels of the modulated light beam provided to the head blanking region, prioritizing ongoing image analysis to the associated head monitoring regions to determine new head positions as the subject moves, and modifying head region image blanking to track and overlap the new head positions.

In accordance with another aspect of the present invention there is provided a method for providing improved eye safety while operating an image projection system, including: operating an image projection system that generates a modulated light beam which forms images on a display surface, monitoring an area in front of the display surface, and at least inclusive of the display surface, with at least one image capture device, analyzing images acquired by the image capture device to locate subjects that can obstruct a portion of the modulated light beam prior to the display surface, analyzing the images of the located subjects to locate subject bodies or head features, thereby identifying candidate head regions on the subjects, determining a head blanking region for a candidate head region associated with a subject, blanking image projection to the head blanking regions by substantially reducing the light levels of the modulated light beam provided to the head blanking regions, validating identification of candidate head regions and associated head blanking regions based on further image analysis, continuing image blanking for positively identified head regions.

In accordance with a further aspect of the present invention there is provided method for providing improved eye safety while operating an image projection system, including the steps of; operating an image projection system that generates a modulated light beam which forms images on a display surface, monitoring an area in front of the display surface that is at least inclusive of the display surface with at least one sensing device, analyzing data collected by a sensing device to locate objects that can obstruct a portion of the modulated light beam prior to the display surface, further analyzing the data related to the objects to determine whether the objects are animate or inanimate, blanking image projection to at least portions of an identified animate object, while allowing image projection to identified inanimate objects.

Aspects of the present invention also encompass methods that utilize; an image capture devices, monostatic microwave sensors, bio-electric field sensors, or combinations thereof.

Further aspects of the present invention encompass methods for providing improved eye safety while operating an image projection system that utilize body shape analysis, image difference analysis, shadow image analysis, subject-in-box analysis, head shape analysis, skin area analysis, facial feature analysis, or eye-shine analysis, or combinations thereof, as search techniques for locating subjects in a monitored area.

In accordance with a further aspect of the present invention there is provided a laser projection system with improved eye safety, that includes: a laser light source which provides a light beam, a light modulation means which imparts image data to provide a modulated light beam, a projection lens which forms an image on a display surface with the modulated light beam, at least one camera directed for image capture of a monitored area including the display surface, an obstruction analysis means to assess the monitored area to locate objects that can intercept a portion of the modulated light beam prior to the display surface, a feature extraction analysis means to assess images of obstructing objects to determine head characteristic features and to identify candidate head regions thereon, and a motion analysis means to assess the motion of the obstructing objects, wherein the candidate head regions are analyzed relative to motion and head characteristic features to determine both head blanking regions and head monitoring regions, such that portions of the modulated light beam that are directed to at least the head blanking regions are blanked by the projection system, while the projection system uses the defined head monitoring regions to track and modify head region image blanking relative to object movement.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

FIGS. 5b-h depict different examples for blanking portions of the projected image during the presence of a detected object near the screen.

FIG. 6a depicts a subject individual who may be found in projection space.

FIG. 6b depicts an ellipsoid human body model.

FIG. 6c depicts a silhouette of a portion of a human body.

FIG. 6d depicts the use of a human body model to identify a candidate head region.

DETAILED DESCRIPTION OF THE INVENTION

Figure 1:
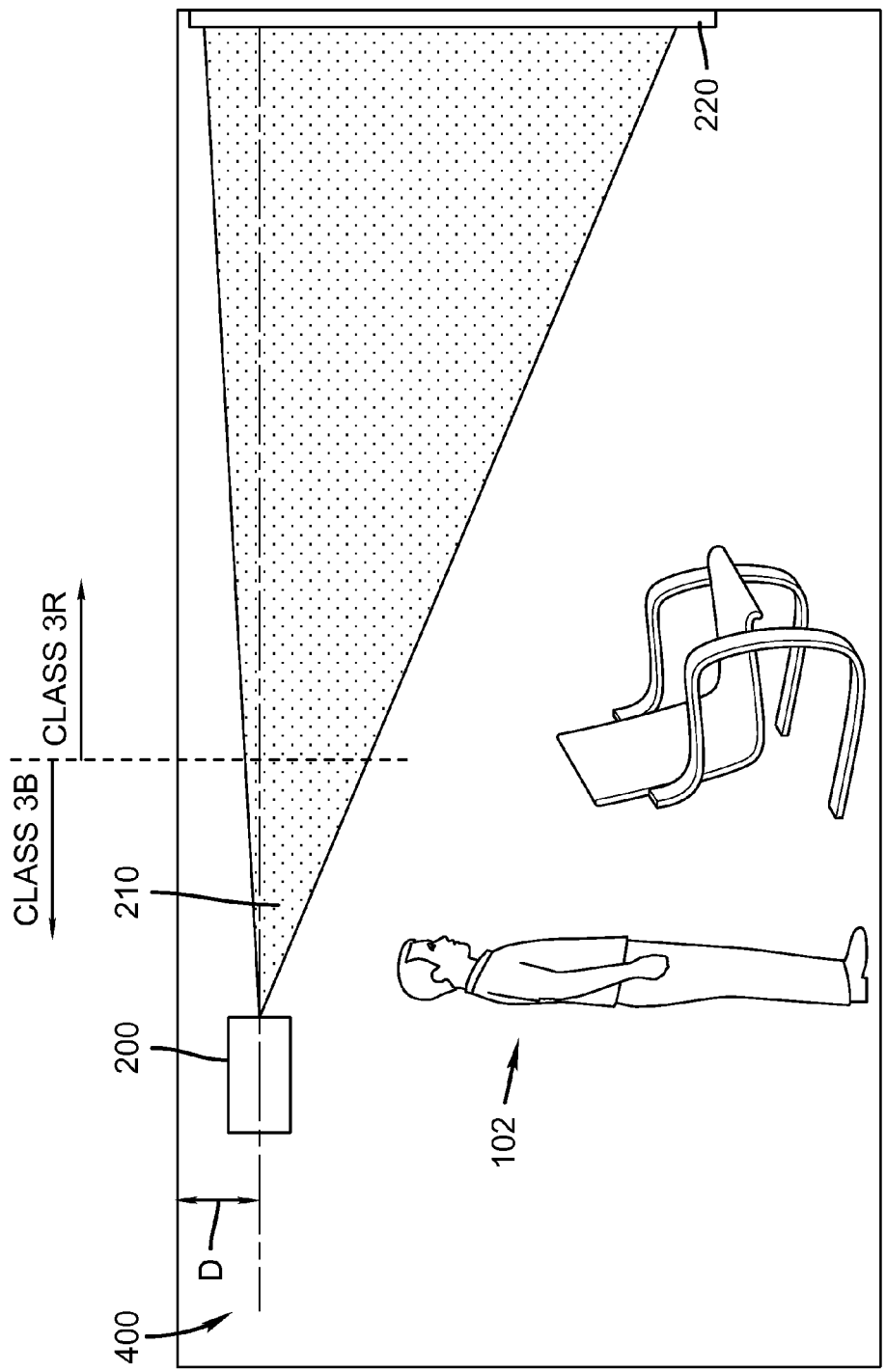
FIG. 1 depicts the use of an image projection system in an environment.

To provide perspective, a scenario is depicted in FIG. 1 in which a viewer 102 within a local environment 400 is observing an image that is projected on a screen 220 by a projector 200 that emits a light beam 210. An intruding object may intercede between the projector 200 and screen 220, such that all or a portion of the light beam 210 falls on the object, and all or a portion of the light beam 210 is then prevented from reaching the screen 220. In the scenario of FIG. 1, projector 200 is a ceiling mounted long throw projector, in which the projector 200 is located a significant distance (for example >8 feet) from the screen 220. The optical axis of the projector is a distance "D" from the ceiling. The projection lens (not shown) can be used in an off axis situation to bias projection downwards relative to the optical axis. Various areas within the light beam 210 can be at energy levels consistent with various laser eye-safety exposure levels, such as depicted in FIG. 1, in which the beam volume proximate to the projector is Class 3B, while the beam volume towards the screen 220 is Class 3R. The current IEC laser classification standards can be summarized as follows:

Class 1: Not considered hazardous during normal operation

Class 2: Visible laser emissions not considered hazardous within 0.25 seconds delay of the eye aversion response; generally equivalent to a laser pointer.

Class 3R: Marginally unsafe for intra-beam viewing, assuming eye aversion response aids safe use; up to 5 times the class 2 limit for visible lasers Class 3B: Eye hazard for intra-beam viewing, usually not an eye hazard for diffuse viewing Class 4: Eye and skin hazard for both direct and scattered exposure While some laser-based image projection systems may operate with Class 2 ratings at the screen 220, many systems will be designed with higher target power levels, whether to enable functional use when ambient light conditions are fairly bright, or to attain cinema-level illumination standards (16 fL), which will likely put them in the Class 3R category at or near the screen. In controlled environments, including movie theatres, the probabilities of eye-risk exposures can be greatly reduced by the design of the viewing space and the use of physical or sensing barriers. By comparison, in other situations, particularly in a residential environment, design features and barriers may not be present, while human (or animal) behavior can be fairly unconstrained, such that the probabilities of an object intruding into the beam are relatively high.

Figure 2:
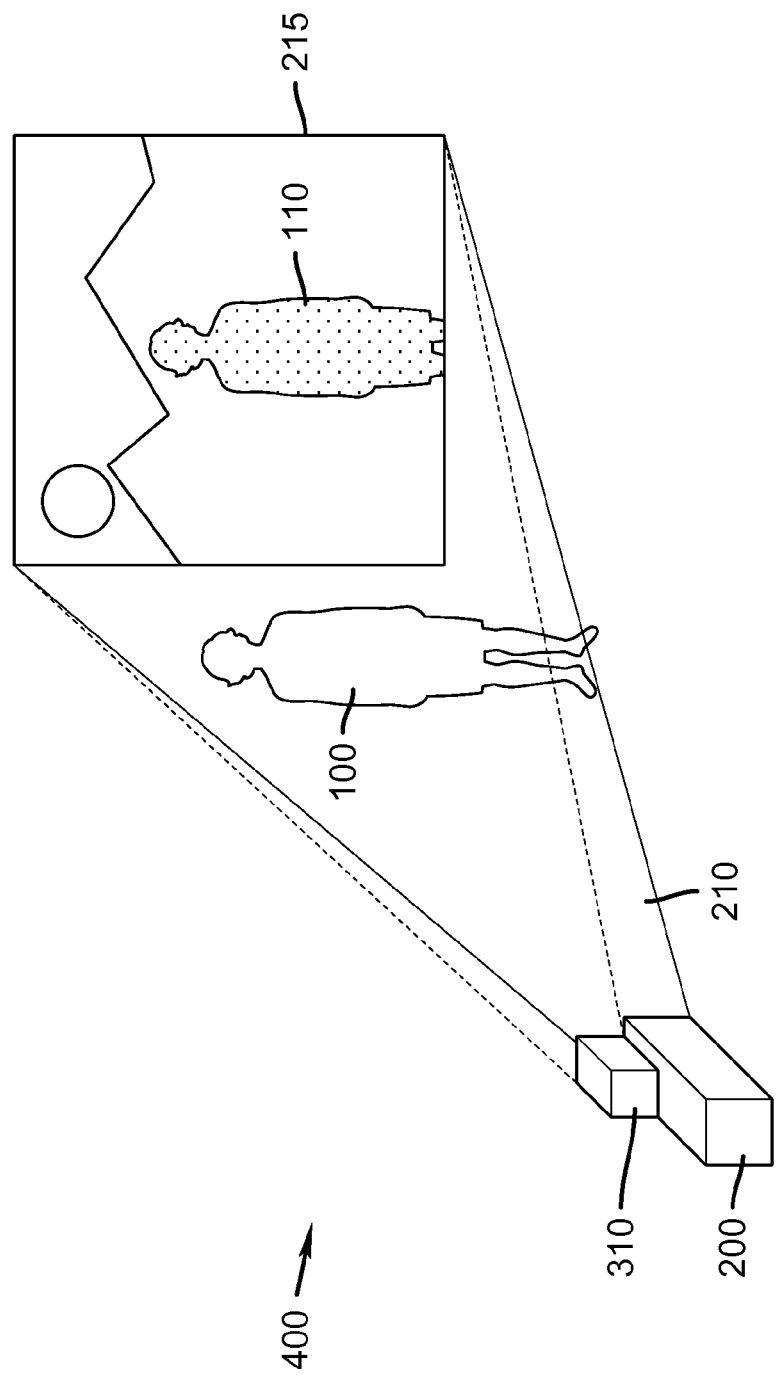
FIG. 2 depicts a prior art laser projection system equipped with a camera for enabling eye-safe operation.

As a result, various solutions have been suggested to equip image projection systems with sensing sub-systems to detect intruding objects and blank or reduce the illumination (laser) light falling on at least a portion of the object. As one prior art example, the commonly assigned Agostinelli '039 patent, as shown in FIG. 2, provides a projector 200 with a camera 310 that looks for an intruding subject (or object) 100 within the illuminating light beam 210. The projector 200 provides a projected image 215 on a display surface as a two-dimensional array of pixels. The projector 200 internally has a laser light source, an image modulator for forming an image-bearing beam according to scanned line data, and projection optics for projecting the image-bearing light beam 210 toward the display surface. In one example in Agostinelli '039, the camera 310 obtains a sensed pixel array pattern by imaging the display surface (screen 220) with a two-dimensional sensor array. An internal control logic processor compares the sensed pixel array pattern with the corresponding known image data on a frame-to-frame basis to identify image differences indicative of any portions of the image-bearing beam that are obstructed by an object 100. When an affirmative answer occurs, the projector 200 disables the obstructed portions of the image-bearing beam for at least one subsequent image frame. Agostinelli '039 also provides motion tracking and outline sensing to determine how to provide further image blanking as the intruding object moves, and image filling or un-blanking in the regions vacated by the intruding object 100.

One problem with the image difference method provided by Agostinelli '039 is that the derived signal for tracking the intruding object 100 is lost once image blanking occurs. Alternately, Agostinelli '039 suggests that IR illumination and imaging can be used determine image blanking and image filling, using either passive (ambient or thermally emitted) or active IR light. Agostinelli '039 also anticipates that face recognition or red-eye detection algorithms can be used to determine the location of the obstructing subject 100, and thereby to block laser radiation to the area around the eyes of the subject 100. However, Agostinelli '039 does not develop the use of either face detection algorithms or eye-detection algorithms in much detail. As a result, the suggested mechanisms for enhancing laser eye safety using such algorithms are not as robust as they can be.

In particular, Agostinelli '039 briefly cites prior art related to the detection of facial features or pattern features (such as the eyes), as well as red-eye detection. As one particular example form Agostinelli '039, red-eye detection can seem like a useful attribute to target, as a human red-eye image is usually bright, saturated, and in high contrast to the surround. However, the presence of the red eye phenomena with human eyes is angle (or pose) dependent, iris (pupil) diameter dependent, and wavelength dependent, and thus may not provide reliable feedback for eye exposure. Moreover, red eye generally occurs with flash rather than CW illumination, and thus may not typically occur when human eyes are illuminated by a projector 200. Additionally, at present, red eye detection algorithms are slow and not particularly suitable for real time image screening applications. Thus, as will be discussed subsequently, more robust solutions for providing eye-safety during the circumstances of image projection can yet be developed, including the approaches provided by the present invention.

As noted previously, the eye exposure laser safety standards assume that the eye aversion response, which occurs in ~250 ms (or ~8 frames of exposure at standard video rates) will aid eye safety for human subjects exposed to Class 3B radiation. However, the intruding subject 100, whether human or animal, may choose not to look away, or may have a medically compromised eye aversion response. The eye damage a human viewer can incur from laser exposure can also depend on the initial eye accommodation (optical power or focus), which also changes relatively slowly (over 500 ms) compared to the frame rate.

As another aspect, the laser safety standards are written assuming a human eye that may encounter direct laser exposure is daytime (or photopically) adapted. The human visual system is capable of perceiving luminance levels in the range of about twelve orders of magnitude, spanning the photopic range (1 to $1 \times 10^6$ candela/m$^2$), the scotopic range ($10^{-2}$ to $10^{-6}$ cd/m$^2$), and the intermediate mesopic range ($10^{-2}$ to 1 cd/m$^2$). Within portions of the visual range, the eye will adapt and can observe ~4 orders of magnitude of luminance simultaneously. Human dark adaptation to enhance dark vision is enabled by short-term biophysical phenomena, including opening or dilation of the pupil, biased usage of rods over cones, and increases in neural gain in the rods. Other biophysical phenomena, such as stimulation by the photoreceptor chemical rhodospin increase rod sensitivity over longer time periods. As a reference point, the SMPTE standard for screen luminance levels for motion picture projection is nominally 16 ft. lamberts or 55 cd/m$^2$ at screen center, which is at the lower end of the defined photopic visual range. Therefore, during dark scenes, with a 5000:1 frame sequential contrast capable projector, screen luminance may only be 0.011 cd/m$^2$, which corresponds to the mesopic-to-scotopic transition. Thus, it is reasonable to expect that individuals with partially dark adapted eyes, operating in the mesopic visual range, can be subject to direct exposure by projection light if they wander into the beam path. However, sudden exposure of partially (mesopic) or completely (scotopic) dark-adapted eyes is another example not clearly anticipated by the laser safety standards. While light adaptation occurs much more quickly than dark adaptation (seconds vs. 10-30 minutes), it is unclear whether a dark-adapted eye is more vulnerable to laser eye damage than a normally light adapted eye.

Similarly, the laser safety prior art and the laser safety standards ignore the problem of pet-eye exposure. As an example, common nocturnally-advantaged pets such as dogs and cats have eyes with reduced color sensitivity but greater low light sensitivity than do humans. For example, cat's vision is ~6× more light sensitive than human vision, which may make cats' eyes more vulnerable to laser exposure damage. In part, the increased sensitivity is enabled by the tapetum lucidum, a highly reflective membrane layer in the back of an animals' eye, located behind much of the retina. The tapetum lucidum increases visual sensitivity basically by creating a double pass optical system, in which the rods and cones have two opportunities to absorb the incident light. The incident light that is not absorbed in either pass then basically retro-reflects from the eyes. The resulting eye-shine, where the eyes to appear to glow, is an effect similar to the red-eye effect in humans, but with a greater color range (eye-shine can appear blue, yellow, or green, for example). Animal eye-shine is more frequently perceived than the photographic-flash-enabled red-eye effect in humans, but it also is an angularly sensitive effect (only detectable within ~15 degrees of eye normal). While cones are nominally located within a 10° radius corresponding to the fovea, rods extend out in significant quantities well beyond 40°. Thus, while red-eye or eye-shine type effects in humans or pets may help to locate eyes, the angularly sensitivity for these phenomena means laser light can enter and damage an eye, without either phenomena being detectable by a monitoring sensing camera 310.

Given these and other concerns, the present invention provides a projector 200 (depicted in FIG. 3a) equipped with a computer 315, image analysis means 360, system controller 320, and sensing means 305. The projector 200 comprises an assortment of optics 330, including one or more light sources (lasers 332), image data modulators 334, and a projection lens 335, which provide an output image-bearing light beam 210. The projector 200 can utilize a variety of technologies to modulate the light, including micro-mirror arrays (such as the DLP device from Texas Instruments) or liquid crystal array devices (such as LCOS (liquid crystal on silicon) displays). In addition to those devices, which are 2D arrays, linear array devices, such as the grating light valve (GLV) or the conformal GEMS (Grating Electro-Mechanical System) device can be used. With a projector 200 having a linear array device, a scanner (not shown) such as a galvanometer or polygon is typically used to sweep image scan lines across the screen to form an effective 2D image. Commonly assigned U.S. Pat. Nos. 6,411,425 and 6,476,848 (both to Kowarz et al.) disclose imaging systems employing GEMS devices in a number of printing and display embodiments. The projector 200 can also be a raster scanning system, where one or more laser beams are scanned across the display surface in a point-wise fashion.

Figure 3A:
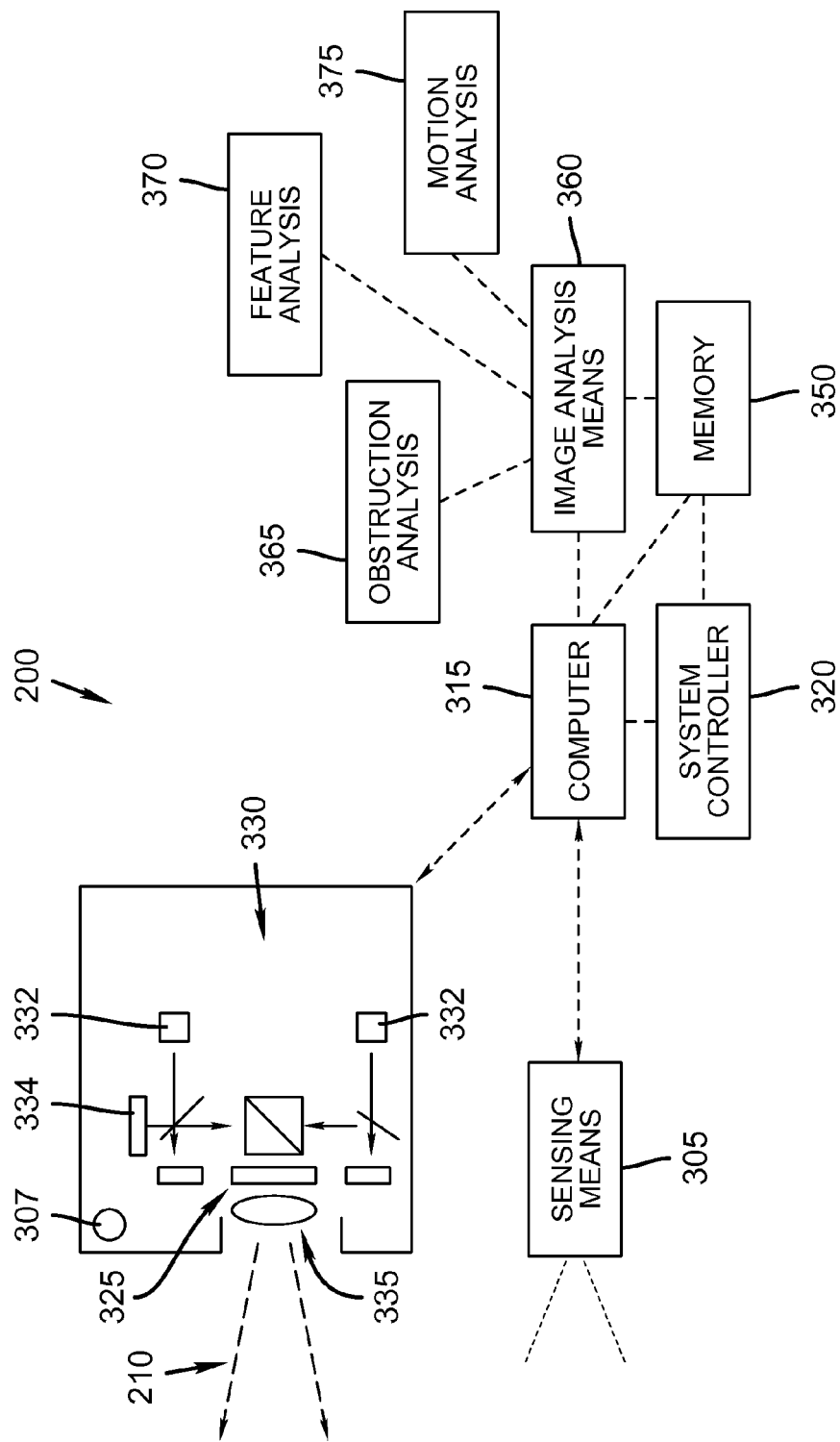
FIG. 3a depicts a projection system of the present invention that is enabled with sensing and image analysis means for enabling eye safe operation.

As shown in FIG. 3a, the image analysis means 360 includes an obstruction analysis algorithm 365, a feature analysis algorithm 370, and a motion analysis algorithm 375. In particular, data is collected by sensing means 305 (which is nominally one or more cameras 310) and provided to the image analysis means 360 (which is nominally an image processor) that analyzes the sensed data using various algorithms (including previously mentioned algorithms 365, 370, and 375). When the image analysis locates and assesses the presence of an intruding object 100 in the light beam 210, the computer 315 can direct image blanking to occur, via system controller 320 and light blocking shutter 325. It should be understood that various mechanisms can be used to provide image blanking, either individually, or in combination, including physical shutter mechanisms 325 (such as blades or electro-optic devices) that block the beam, physical devices (such as mirrors) that re-direct the light beam, or changes in the control or image data signals to the lasers 332 or modulators 334. It is noted that projector 200 can also include a monitor light source 307 that provides light, such as IR light for illuminating the monitored area 355. The dashed lines between the computer 315, the image processor 360, the algorithms, and other components represent a portion of the network or data path connections within the projector 200.

Figure 3B:
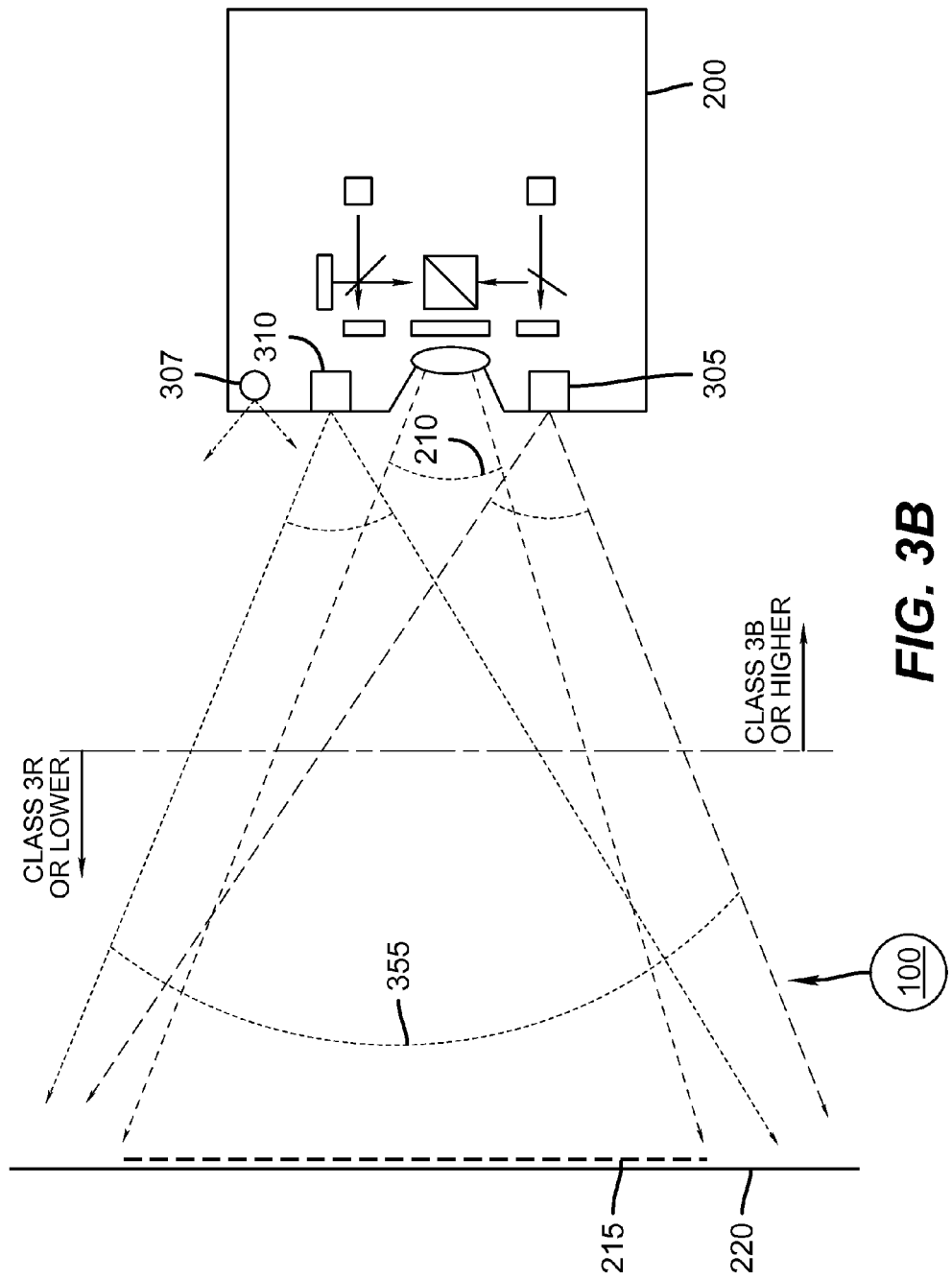
FIG. 3b depicts a projection system of the present invention with respect to the screen on which an image is projected.
Figure 4:
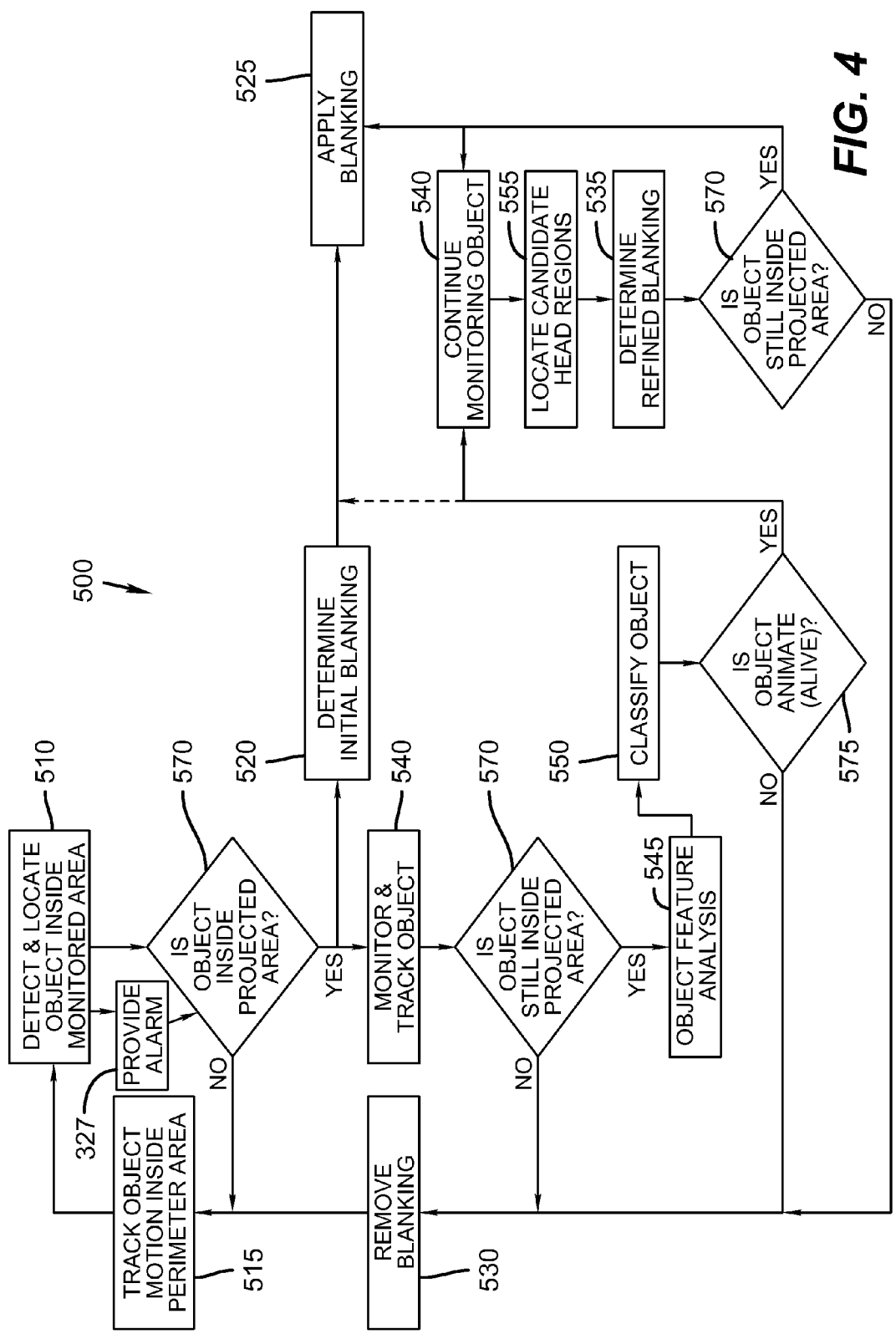
FIG. 4 depicts a flowchart showing a process or method of the present invention for operating a projection system to manage the risk of accidental eye exposure.

For clarity, FIG. 3b shows aspects of the system configuration in greater detail, while FIG. 4 outlines operational processes and logic the projection system 200 can use in sensing, assessing, and responding to intruding objects in the beam path. As shown in FIG. 3b, one or more sensors 305 are used to examine a monitored area 355 that nominally includes at least the light beam 210, the display surface 220 and a surrounding perimeter area. In general, the method of the present invention is best directed towards providing eye safety near the screen 220, rather than in the Class 3b or Class 4 areas proximate to the projector. This is also because the blanking rules near the screen 220, where the light levels can be Class 3R or less, are more suitable for finessed decisions that provide eye safety while reducing viewer irritation. In contrast, near the projector 200, where light levels can be at Class 3B or Class 4 levels, the blanking rules are absolute (for example, blank image projection completely for any intruding object 100, until the object is removed). Also, the geometry requirements (short distances, wide angles) in this near projector region may not be particularly suitable for camera-based sensing. Thus, the monitored area 355 addressed by the present invention may not encompass the volume of the environment 400 proximate to the projector 200 where the light beam 210 is brightest. On the other hand, the monitored area 355 is preferentially larger than the projected image size at the display surface 220, thereby providing perimeter monitoring, which can allow the projector 200 to anticipate the presence of an intruding object 100 before it actually enters the light beam 210. In such instances, the projector can issue an alarm 327, or characterize the object 100 to determine whether it is animate (living) or inanimate (non-living), human or animal, or determine anticipatory blanking, or analyze the object to identify and locate candidate head regions 245, or prioritize some computational capacity for the object. Screen (or display surface) 200 can reside in a plane, or be curved, or comprise a more complex 3D shape. As a generalized display surface 200, "screen" 200 can simple be a section of wall, for example.

The projection monitoring geometry (particularly for long throw projection) can be well served by camera-based sensing means 310 and image analysis means 360. Camera(s) 310 can be a fixed focus lens (including hyperfocal), a fish eye lens (with a field of view, short focal distance, but much distortion), or a zoom lens, or provide stereo capture, and capture visible or IR light. However, as will be subsequently discussed, the sensing means 305 can include other sensing technologies, such as EM-bio-field detection, microwave, or ultrasound based intruder detection.

FIG. 4 depicts an exemplary object exposure management process flowchart 500 that illustrates processing that the present invention can implement in sensing, assessing, and responding to intruding objects 100 in the beam path 210 or in the monitored area 355. As shown, the light exposure management process 500 includes an initial object detection and location step 510 in which a motion analysis algorithm 375 and an obstruction analysis algorithm 365 analyze sensed data collected from the monitored area 355. In at least a first instance where an object 100 is detected, an alarm 327 can be provided. As the projection environment 400 can include numerous objects, including innocuous objects 100, such as a vase that is sitting motionless on a shelf near the edge of the screen 220, various testing methods, including use of reference images, motion analysis to look for moving objects, or detection methods that identify and localize animate (alive) objects 100, can be used to distinguish between innocuous objects 100 and objects that represent at least an initial exposure concern. If an object 100 is determined (via object in area test step 570) to be outside the projection area or light beam 210, but with the monitored area 355, then the projection system 200 can remain in a watchful state, relative to that object, until the object leaves the monitored area 355, or enters the light beam 210 (thereby likely requiring a system response), or is determined to be completely innocuous.

On the other hand, if the object 100 is inside the projected area of light beam 210, the projection system determines an initial image blanking (step 520). In particular, the initial image blanking step 520 can use the obstruction analysis algorithm 365 to quickly determine the size and location of the object 100 and then define an initial image blanking that at least encompasses the object 100. The initial image blanking originating with step 520 is then enacted via apply blanking step 525 using system controller 320. In parallel, active monitoring and tracking of the object 100 continues via step 540 using motion analysis algorithm 375, to enable ongoing image blanking. If the object 100 is still in the projected light beam 210, as determined by an object in area test step 570, then an object feature analysis step 545 occurs, which uses sensed data or a feature analysis algorithm 370 to find features that enable an object classification (step 500). As an example, an object 100 can be classified using image analysis algorithm 360 as animate (alive) or inanimate (not-alive). In the latter case, following the object animate test step 575, the initial image blanking can be removed or altered (via step 530) using system controller 320, perhaps with an accompanying warning or alarm. More generally, for example, an object 100 can be classified as human, pet, cat, dog, or as a moving inanimate object.

Figure 5A:
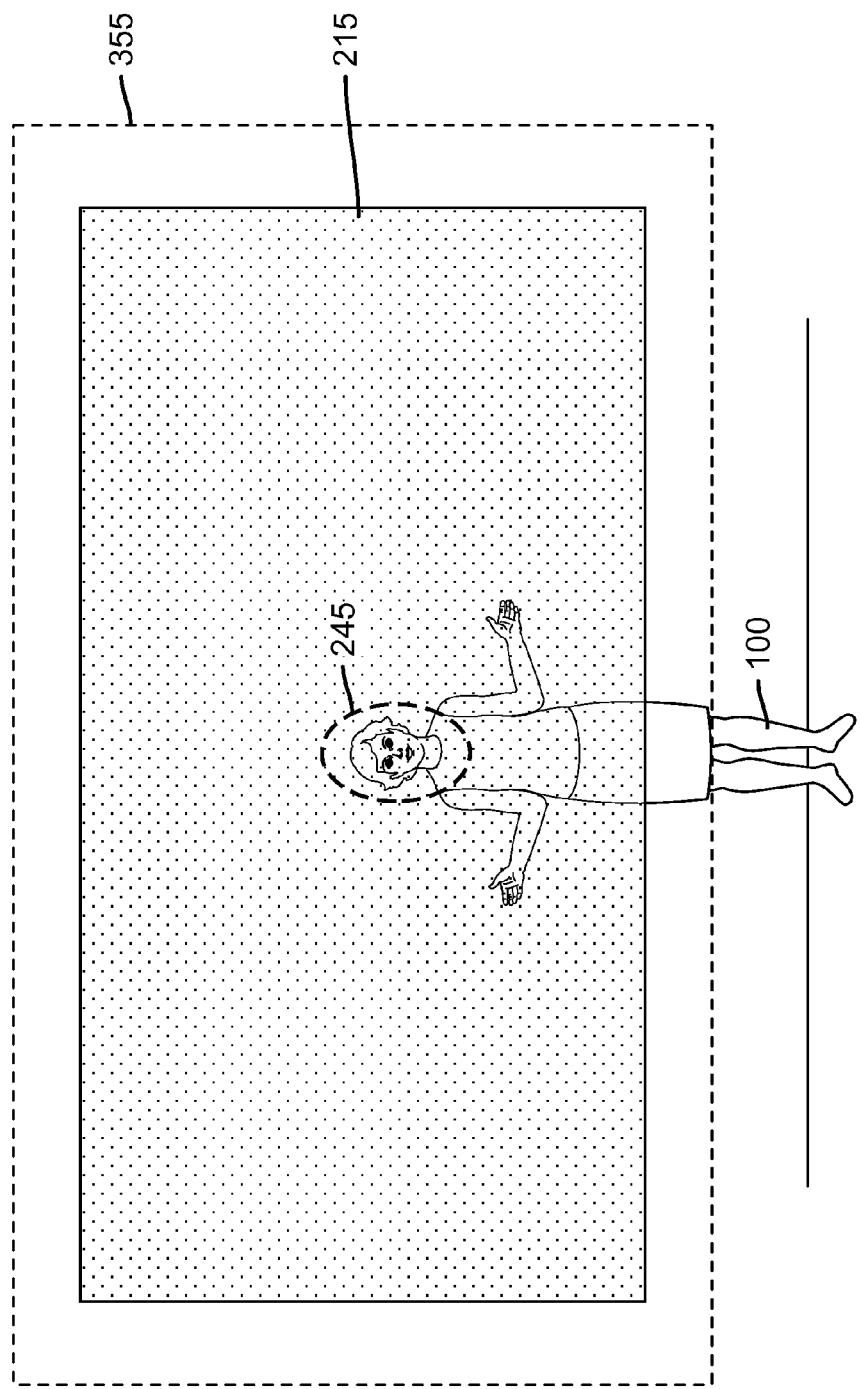
FIG. 5a depicts an object (person) within the projected beam prior to any image blanking being provided.
Figure 5C:
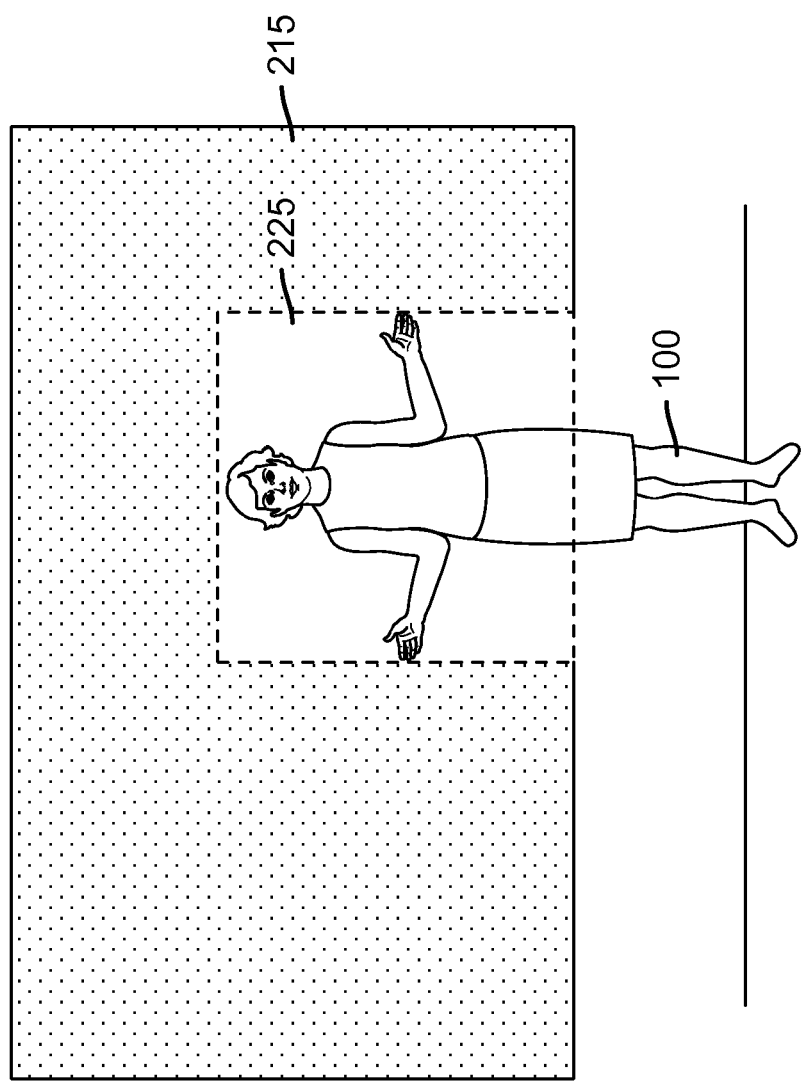

When an object 100 is determined to be animate, object monitoring and tracking will continue step 540, thereby enabling continued image blanking and further object feature analysis using feature analysis algorithm 370 to locate candidate head regions 245, eye features, or other salient object attributes, as shown in step 555. Once candidate head regions 245 are identified, head monitoring regions 235 and a refined image blanking (step 535) can be determined. If the object is still inside the projected area (tested at step 570), then the refined image blanking can be provided (step 525), and object monitoring can continue (step 540). A monitor and tracking loop, targeting monitoring and image blanking to candidate head regions 245 using head region blanking 240 can then be maintained until the object 100 leaves the projected image area. As will be subsequently discussed, image blanking can span a range of blanking options, including large blanked areas (FIGS. 5b and 5c), general torso area blanking (FIG. 5d), or silhouette blanking (FIG. 5e), before attaining head region blanking 240 (FIG. 5f or FIG. 5g), or inanimate object (100a) object exposure (FIG. 5g).

It should be understood that the object exposure management process 500 can provide object detection for stationary objects that are present at turn-on, and not just objects 100 that move into the monitored area 355 or projected light beam 210 during image projection. At turn-on, before a high power projected image beam 210 is emitted, the initial object detection and location step 510 can search for objects 100 using visible or infrared imaging, reference images, EM field sensing, ultrasound, or other means, to detect and locate objects 100, and preferably characterize them as animate or not. Some objects 100 can also be tagged as "status uncertain". If these objects are outside the projected image area 215, the system 200 can simply tag them for monitoring until at least their status become clear or they are removed. If these objects are inside the projected image area 215, image blanking can be applied until the status of uncertain objects is clarified as inanimate, or until the objects are removed. As can be imagined, objects such as stuffed animals can prove particularly difficult. In this regard, reference images are images of the monitored area 355 that are acquired prior to image projection. These images can be acquired using visible or IR light or both. A new reference image can be compared to a prior reference image that may have been acquired the last time the projection system 200 was operated, as an aid to recognizing static inanimate objects 100.

In general, image blanking is intended to describe an image area in which the light beam 210 for the blanked region is effectively off, and image light from the projector 200 does not enter that area. Alternately, blanking can still allow image light to be directed to the designated eye-safe areas, but with the light intensity reduced to safe eye exposure levels (nominally Class 2 or less). FIG. 5a depicts a situation in which a subject 100 is within the projected image 215, but blanking has not yet occurred. Under these circumstances, a range of blanking options exists. As a first example, the entire image-bearing light beam 210 can be blanked, such that projector 200 does not illuminate the display surface 220 with a projected image 215 until the object (obstruction) 100 is removed. While this is likely the appropriate blanking decision if the object 100 is near the projector (Class 3B or Class 4 space), near the screen (Class 3R or Class 2 zones) other blanking options exist. FIG. 5b depicts a second option for blanking, in which the projected image is blanked for the width of the object 100 (with margin), and the height of the screen 220, providing a blanked image portion 225. FIG. 5c depicts a third option for blanking, in which the projected image 215 is blanked to create an area of blanked image 225 defined by the width and height of the object 100m (with or without margin). Whether the entire screen is blanked, or the partial screen blanking options of FIG. 5b or 5c are applied, as significant areas of the projected image 215, beyond those occupied by the object itself, are blanked, viewer annoyance can increase.

Figure 5D:
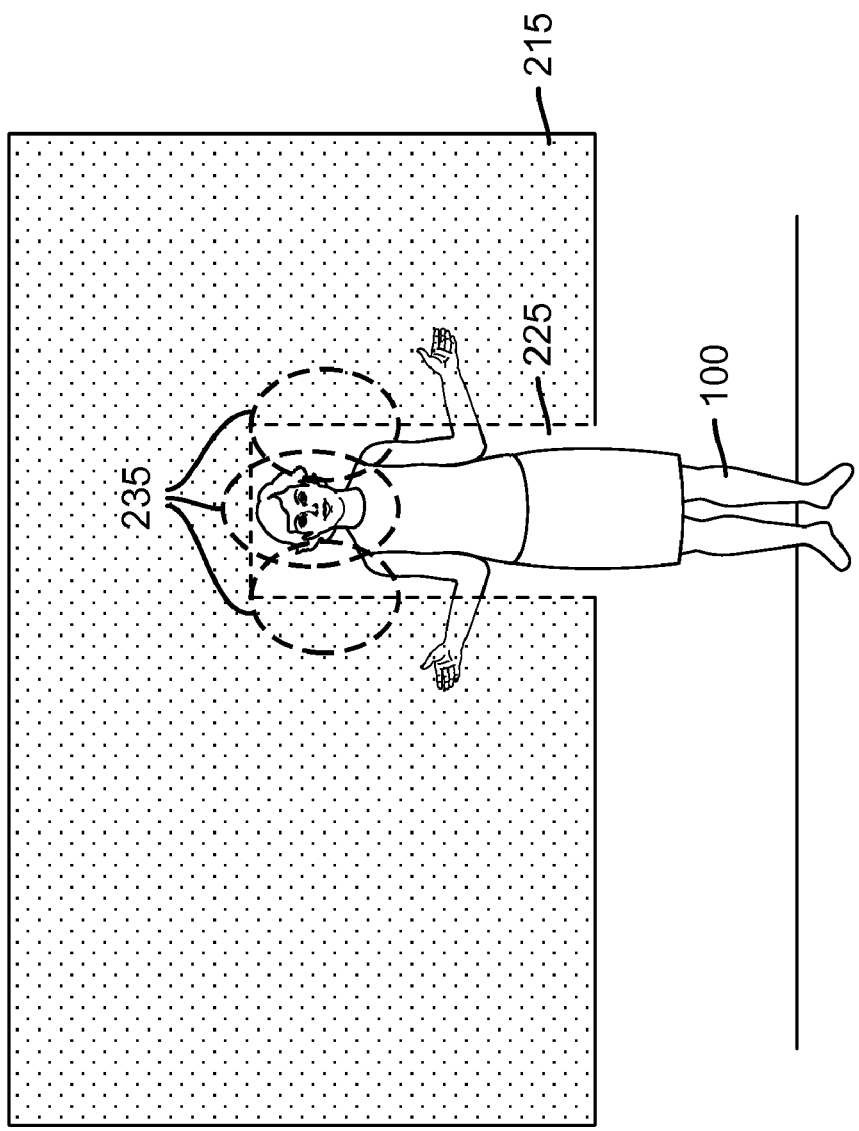
Figure 5E:
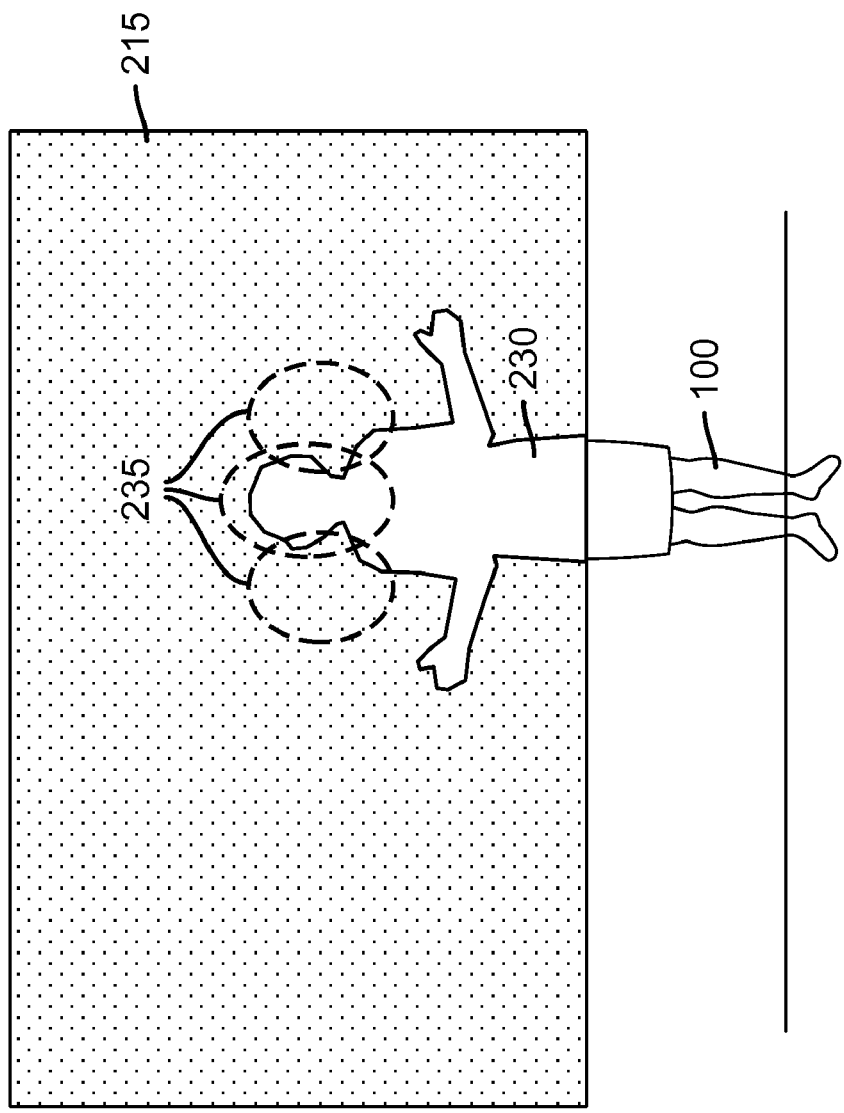
Figure 5F:
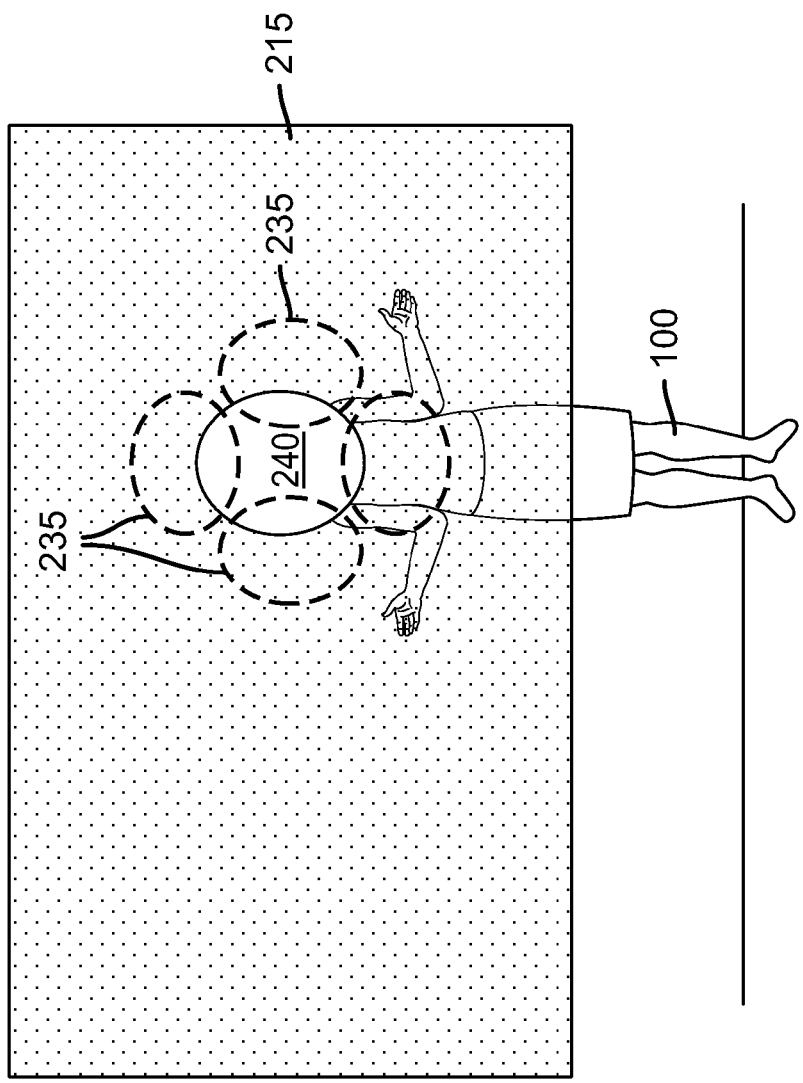
Figure 5G:
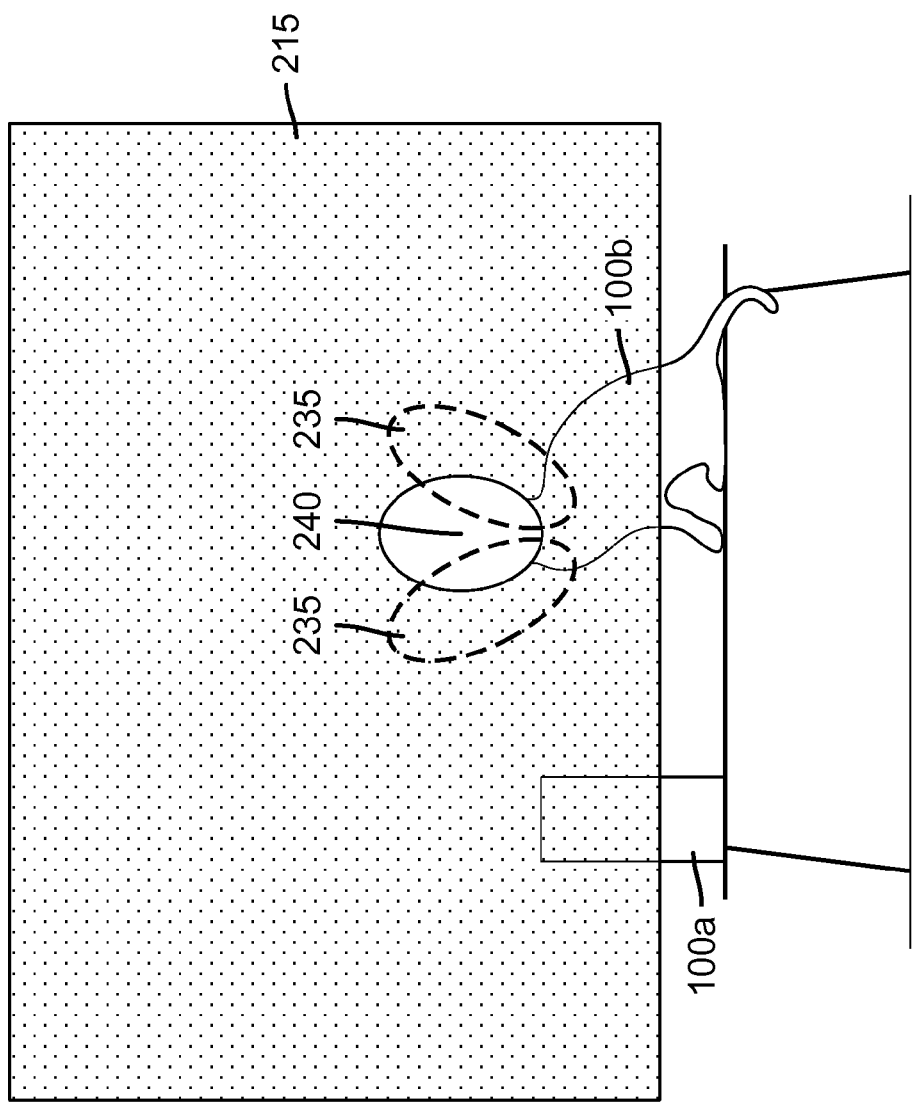

FIG. 5d depicts a fourth blanking option, in which the body shape of a person or animal (object 100) must be sufficiently understood to allow some innocuous portions, such as outstretched limbs, to be illuminated, while generally blanking image projection to an expanded torso area (including the head). FIG. 5e depicts a fifth blanking option, in which the sensed image of the intruding object 100 is analyzed to find an outline, and then the outlined area, or an expansion thereof to provide margin, is then blanked, effectively creating a blanked object silhouette 230. This is similar to the outline image blanking discussed in the commonly assigned prior art Agostinelli '039 patent. FIG. 5f depicts a sixth blanking option, in which head region blanking 240 is applied, and associated head monitoring regions 235 are identified. In the case of FIG. 5f, the head region blanking 240 is applied relative to a human subject 100, while FIG. 5g depicts head region blanking applied to an animal (object 100b). As a progression of blanking options shown by FIGS. 5b-g, torso blanking (FIG. 5d), silhouette blanking 230 or head region blanking 240 represent refined image blanking with less image area being lost for the viewers. However, while the lost image area is smaller, the risks of subsequent eye exposure are potentially higher. Thus, as the image blanking becomes increasingly tighter around the intruding object 100, the accuracy of the image screening methods to locate and track head or eye-regions are increasingly pressured to enable a compensating eye exposure risk reduction.

As suggested by the method of FIG. 4 and FIGS. 5b-5h, when an intruding object 100 is located within the light beam 210, a range of blanking options are available. In many instances, it can take time (for example several frame times) to obtain a conclusion with high confidence that an intruding object is animate (alive) or inanimate (not-alive), and in the former case, to then localize body shapes, then head regions, and finally eye regions. Therefore, it can be preferable to provide an initial blanking (step 520) in response to the presence of an intruding object 100 that is significantly oversized, such that accidental eye-exposure is highly improbable. As an example, an initial blanking can blank the entire screen, or span the screen height and object width (as in FIG. 5*b*), or span the object's height and width in the projection space (FIG. 5*c*). Certainly, a smaller initial blanking, as in FIG. 5*c* or FIG. 5*d*, is likely preferable from the viewers point of view. Then, as subsequent analysis of the sensed data enables better classification of the object (as inanimate, or as animate (and then as a person or an animal), and better characterization of body regions of the animate objects, the blanking can be relaxed (step 575, allowing illumination of inanimate objects (object 100*a* in FIG. 5*g*)) or tightened (step 535, to blank only silhouettes (230 in FIG. 5*e*) or head blanking regions 240 (FIGS. 5*f* and 5*g*).

A variety of sensing and analysis methods can potentially be used to screen for animate objects 100, object silhouettes 105, head monitoring regions 235, candidate head regions 245, faces, or eyes. As will be seen, a variety of screening methods are required to robustly reduce eye exposure risk. In particular, detection and characterization of body shapes or silhouettes 105, followed by localization of candidate head regions 245 and head monitoring regions 235 are useful. The candidate head regions 245 are the identified areas where image analysis determines that one or more heads are likely located. In most cases, the body shape analysis will yield one candidate head region 245 per body shape, but if the shape is sufficiently complex or atypical, the uncertainty may result in multiple candidate head regions 245 being identified, although continuing analysis may resolve the uncertainty. In some cases, this uncertainty can mean that image projection to several candidate head regions 245 for a body shape, or to all or most of the body, is blanked because the uncertainty is unresolved. In most cases, feature analysis will identify one candidate head region 245 per body 120 or body shape with high certainty. In that case, the candidate head region 245 is tagged to be blanked, thereby defining a head blanking region 240. However, even when candidate head regions 245 are identified with high confidence, the head region blanking 240 (FIG. 5*f*) should be over-sized (for example, by 40%) relative to an associated candidate head region 245, to provide margin, reducing risk relative to sudden head movements. For a viewer 102, the oversized head region image blanking 240 around the intruding subject 100 may appear as a bubble or halo around the head, against the backdrop of image projection to the rest of the screen 220.

Identification of a candidate head region 245 also can lead to determination of head monitoring regions 235 associated with that candidate head region 245. The head monitoring regions 235 represent the likely image areas where a candidate head region 245 or a blanked head region 240 can be in a subsequent time as the object (person or animal) moves. Computing power can then be prioritized to identify subsequent head motion into a head-monitoring region 235 as the subject moves, so that head blanking regions 240 can be shifted accordingly in a rapid manner. The use of head monitoring regions 235 is closely coupled to motion detection and motion tracking (via motion analysis 375) of the object 100. Subject movement can be measured using a subject movement factor that tracks the speed, range, and frequency of subject motion relative to an area, which can be the overall monitored area 355 or a body shape area (for example).

Information regarding patterns of body movement for typical intruders such as people or cats can also be used to define and prioritize the head monitoring regions 235. For example, a series of head monitoring regions 235 are shown around the blanked head region 240 of FIG. 5*f*. However, for a standing person, there will be differential probabilities of the individual's head moving sideways (high) versus downwards (modest) or upwards (low). Likewise, the application (size and positioning) of head region blanking 240 and head monitoring regions 235 can be biased in the direction subject movement. Thus, for example, as a person crosses through the projected image from right to left, the eye exposure probability is then higher to the left than right. To compensate, the head region blanking 240 can extend more to the left than right, and emphasis on head position monitoring using head monitoring regions 235 can favor the left. The head blanking region 240 and head monitoring regions 235 can also be larger for moving subjects 100, as compared to more stationary subjects. The application of head region blanking 240 and head monitoring regions 235 can also be different for animals, as compared to people. For example, as animals, such as cats or dogs, can both move faster and more unpredictably than people do, larger areas of the projected image can be blanked on a percentage basis when an animal is passing through the projected beam near the display surface 220. Subject movement through the display area may be so rapid that the projection system may simply have to default to large area blanking (such as FIG. 5*b*) until the subject leaves or settles.

The use of head monitoring regions 235 or head region blanking 240 depends largely on subject movement, and secondarily on subject type (person or animal). Other secondary factors, such as activities lumping, for example), or gestures, may impact their use. While the identification of candidate head regions 245, and then head monitoring regions 235 can support head region blanking 240 (FIG. 5*f*), these techniques can also be used for other tight image blanking approaches, including silhouette blanking 230 (FIG. 5*e*) or torso area blanking (FIG. 5*d*). Of course, as the speed and accuracy of the analysis algorithms improves, initial head blanking regions 240 can potentially be tighter around the heads 125 of intruding objects 100.

In operating a projection system 200 that utilizes intelligent sensing to identify animate intruding objects, and particularly head-like regions thereon, it is important to avoid false negatives, such that candidate head regions 245 are not properly identified and are therefore illuminated. Therefore, it is important to choose robust screening methods, and then to statistically measure the confidence or uncertainty in a determination. In particular, confidence values (or confidence levels), which are measures of the confidence assigned to the value of an attribute, and which are often expressed as a percentage (0-100%) or a probability (0-1), can be calculated to indicate the likelihood that a given image area contains a candidate head region 245. Again, in erring in favor of eye safety, both initial image blanking and tightened image blanking should be oversized relative to at least candidate head regions, if not body-shapes. It is also important to minimize false positive test results, that can cause either safe obstructing objects or non-objects (such as projected image content) to be identified as an intruding animate object with a head or eyes, as such identifications can cause image blanking unnecessarily. Additionally, in the case that the projection system 200 first identifies an intruding object 100 as having a candidate head region 245, and then subsequently determines otherwise (that the intruding object is inanimate), then warning alarms 327 can be provided before any related image blanking is disabled.

Thus, the eye-safety value associated with a projector 200 of the present invention is highly dependent on the robustness of the intelligent sensing used to locate and assess intruding objects as animate, while identifying head regions thereon. As will be discussed subsequently, a variety of techniques can be used for identifying or extracting features from the sensed image data, with associated advantages and disadvantages (also summarized in Table 1). Most of the techniques discussed below are focused on intelligent sensing using data collected with camera-type sensing devices 310 that can use visible or IR light. In general, algorithms within the image analysis means 360 enable these techniques, as represented by an obstruction analysis algorithm 365, a feature analysis algorithm 370, and a motion analysis algorithm 375. The obstruction analysis algorithm 365 basically determines the location, size and shape of an obstruction. The feature analysis algorithm 370 determines head, facial, or eye features that blanking and monitoring can target. These image analysis algorithms also preferably determine whether the obstruction (object 100) is animate (alive). A range of image interpretation algorithms or techniques can be used for obstruction analysis or feature analysis, depending on the available sensed data, object characteristics, and processing limitations.

Screening for Intruding Objects 100 Using Image Differences

By this approach, which is similar to that in the commonly assigned Agostinelli '039 patent, a sensing camera 310 detects images of the screen 220 and any intervening intruding objects 100. Depending on the position, three dimensional shape, and surface properties (mainly reflectivity) of an object 100, image difference comparisons of the sensed image to the projected image will appear as image distortions or brightness variations. Image difference analysis can provide an outline or silhouette 105 of the intruding subject 100 (see FIG. 6c), to enable silhouette-blanking 230 (see FIG. 5e). The derived outlines can also be used as input data for body shape analysis, to identify the type of object 100 as human or animal, and to locate candidate head regions 245 and head monitoring regions 235.

This comparative image difference analysis, which can be included in the obstruction analysis algorithm 365, uses image correlation and mutual information calculations, can be robust and quick enough to operate in real time. While the use of the projected image as a reference reduces content confusion (interpreting a projected image of a person as a potentially intruding subject 100), this approach still has content dependence. For example, if an image of a face is projected onto an intruding person's head, the image differences detected by the camera 310 can be reduced, making determination more difficult. Individually, the risk that the image difference method fails to detect the intruding person may still be small, but other aspects of the scene content may add further difficulty. For example, if portions of the projected image that are incident on an obstruction (intruding object 100), or adjacent to obstruction, are very dark, then the image brightness or image distortion differences can be reduced, also making intruding object determination difficult. Additionally, once image projection onto the surface of an intruding object 100 is blanked, then less image difference data is available to support subsequent analysis. Thus, it can be seen that while image difference analysis is useful, it may not be a sufficient screening method onto itself.

Screening for Intruding Objects Using IR Imaging

As discussed previously, laser devices and projection systems using both passive (ambient) and active IR lighting have been previously proposed. While the projector or laser device typically is augmented with IR emitters and sensors, the burden can be small. Although ambient IR light can be used, the uncertain nature of this illumination adds complications.

In particular, the Simms '275 patent uses IR sources and detectors in attempting to detect intruding objects near a laser aperture. Prior art patents Kraenert '605, Tsurushima '675, and U.S. Pat. No. 6,460,999 by Suzuki use IR sources and detectors to provide laser-projection-space perimeter monitoring systems.

Other patents have emphasized screening for intruding objects 100 in the projection space near the screen 220 using IR sources and sensors. Exemplary patents include commonly assigned Agostinelli '039, as well as Vlahos '173, Parker '903, Dadourian '656, and Tamura '786. These patents anticipate that when an intruding object 100 is detected that the image will be blanked or dimmed by disabling image pixels directly or by generating image mattes or masks that alter the image data fed into the projector 200. In these cases, image projection is prevented in an area that at least includes the area occupied by the intruding object 100, and often with additional margin. This type of approach has the advantage that the projected visible light image content does not confuse the sensed IR imagery. Also, an image analysis algorithm operating on IR images, which does not rely on image comparisons, can likely function in real time.

In contrast to this prior art, the present invention provides for a projector 200 that targets the detection and tracking of head regions. Intelligent sensing of body shapes, head regions, and facial features can use visible spectrum images and image difference analysis, but IR images can be helpful because they are readily distinguished from the projected image content. IR imaging can be used both for body-shape and facial feature imaging. However, it is important to note that the appearance of humans and animals changes when viewed in near-IR (NIR) light. For example, key human facial features (hair, skin, and eyes, for example) look different (darker or lighter, etc.) than in real life depending on the wavelength band. As an example, in the NIR below 1.4 µm, skin is minimally absorbing, and both transmits and reflects light well, and will tend to look bright compared to other features. The surface texture of the skin images is reduced, giving the skin a porcelain-like quality of appearance. Whereas, above 1.4 µm, skin is highly absorbing and will tend to look dark compared to other features. As another example, some eyes photograph very well in infrared light, while others can be quite haunting. Deep blue eyes, like deep blue skies, tend to be very dark, or even black.

These imaging differences can aid or confuse body feature detection efforts. As an example, Dowdall et al. (*Face detection in the near-IR spectrum*, Proc. SPIE, Vol. 5074, pp. 745-(2003)), have developed a face detection system which uses two IR cameras and lower (0.8-1.4 µm) and upper (1.4-2.4 µm) IR bands. Their system employs a skin detection algorithm to localize the image analysis, followed by a feature-based face detection algorithm keyed on eyebrows and eyes. They have observed that eyebrows show up very nicely in the upper near-IR band because human hair is highly reflective in this band and contrasts with the highly non-reflective skin. Conversely, eyes show up better in the lower near-IR band because they are non-reflective in this band and contrast with the highly reflective skin. While Dowdall et al. provides insights regarding imaging and image analysis of people and body features, this paper does not consider IR imaging of pets, such as cats and dogs, for whom the image differences can be more varied and unpredictable than with humans. Moreover, depending on what the subjects are doing, or what clothes they are wearing, IR image interpretation can also be confused. Finally, the Dowdall approach requires two IR cameras and filtering, and likely two IR sources. IR-based facial feature detection is useful in of itself, but insufficient, for providing eye-safety with respect to a projection system.

It is also noted that humans, as 300 K blackbody sources, emit thermal IR light in the mid-IR 3-10 μm band. Both cameras and facial detection algorithms have been developed in this wavelength range, and can be used in a projector 200 to aid eye-safety. At present, the camera technology is much more expensive and lower resolution than the available NIR technologies.

In summary, via IR imaging, valuable data can be obtained to generally localize and size an intruding object, for large area blanking (FIGS. 5b and 5c). IR imaging can also be readily used to outline a body shape to determine a silhouetted 105 used in silhouette blanking. However, in more subtle analyses of images to find candidate head regions 245 or characterize body shapes, knowledge of the IR imaging characteristics of skin, hair, eyes, or other features, must be properly accounted for to achieve a successful result.

Screening for Intruding Objects Using Shadow Images

This approach is again similar to one described in the commonly assigned Agostinelli '039 patent. In this case, a sensing camera 310 (see FIGS. 3a and 3b) can be placed in a position offset from the projection axis of projector 200. As a result (see FIG. 2), the camera 310 can image the shadow 110 cast by light beam 210 passing around the intruding object 100. The shadows, which are present with high contrast against the surrounding projected image 215, can be detected by a fast (real-time) screening algorithm. However, if the projected image content includes large dark areas adjacent to, or overlapping the intruding object, shadow-based object detection can be compromised. Additionally, this method requires one or more sensing cameras to be positioned at sufficiently offset angles from the projector optical axis that shadows can be reliably and sufficiently seen. Physical or social limitations can prevent the needed camera placements. While the use of IR cameras and light sources can remove the image content confusion problem, limitations in camera and light source placement relative to the projector 200 and screen 220 still can limit the reliability of this technique. Furthermore, in some instances, including particularly with animals, shadow imagery may be particularly insufficient for understanding physical body positioning and locating candidate head regions 245. In summary, screening for intruding objects 100 based on shadow or silhouette analysis, likely as an aspect of the obstruction analysis algorithm 365, can be useful, but it is not likely a sufficient screening method onto itself.

Screening for Intruding Objects Using Body Shape and Body Models

Figure 6E:
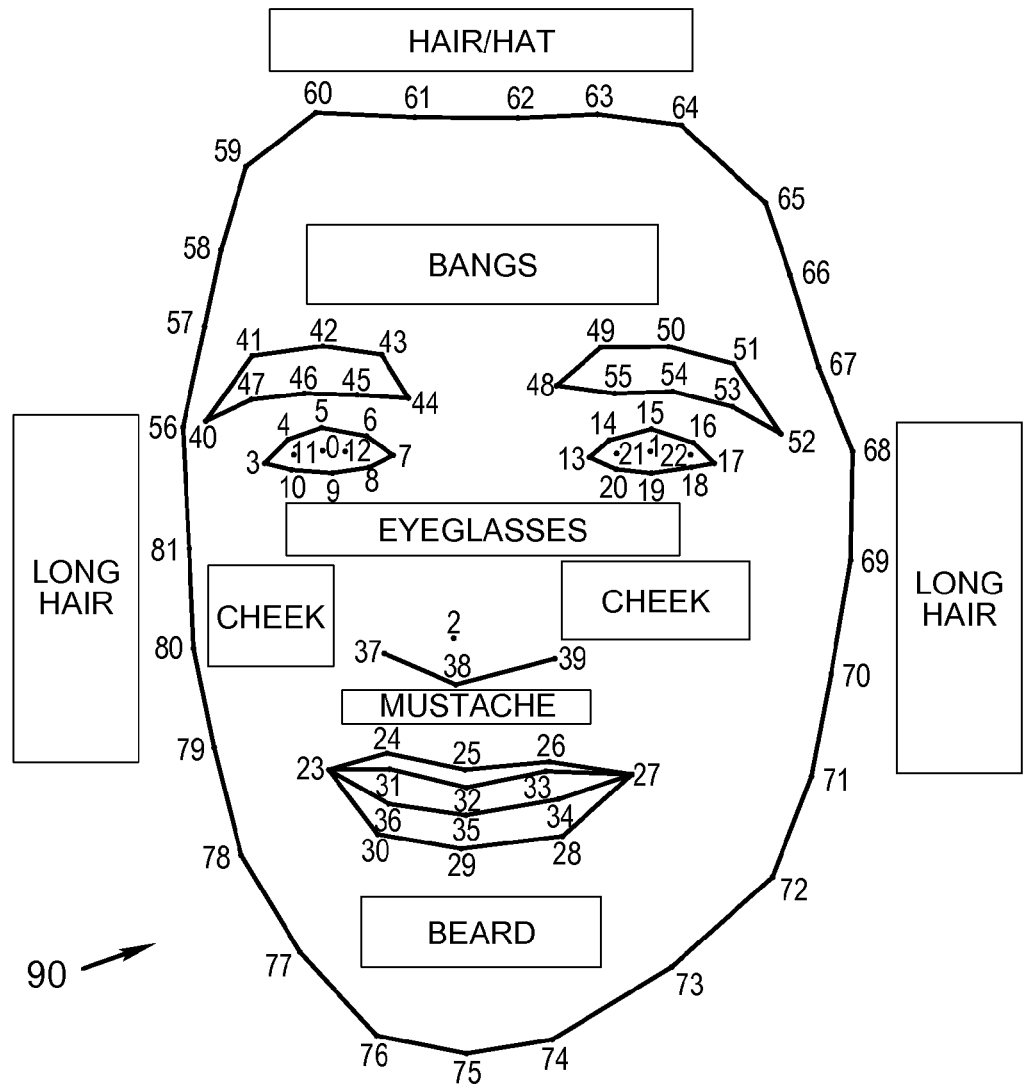
FIG. 6e depicts a facial-feature modeling-construct having 82 facial feature points.

In general, screening sensed images based on body shape characteristics can be highly useful for distinguishing between animate and inanimate objects, distinguishing between people and animals, and then in locating candidate head regions 245 on the body shape of the identified animate objects. An outline of the body shape can be obtained by the image difference analysis and shadow analysis methods discussed previously, or by direct imaging of the body shape with visible or IR light. However, body models can include more information than just outlines, including textures and recognition of joints or articulating limbs to aid identification. Body models can be understood using the illustrations of FIGS. 6a and 6b. FIG. 6a depicts a subject 100 who has a physical body 120 including various limbs, a torso, and a head 125, with a face 130 having eyes 135, mouth 140, and nose 145. FIG. 6b then illustrates a simplified body model 265 in which the torso, limbs, and head are represented by a series on interconnecting body shape ellipses 270. FIG. 6e then depicts face point model 90 which can specifically be used for detection or recognition of faces 130. Body shape detection and/or recognition can then be used to determine silhouettes 105 for silhouette blanking 230 (FIG. 5e) or torso sizing for torso blanking (FIG. 5d), or to identify subjects as people or animals, or to locate candidate head regions 245 and determine head region blanking 240 and head monitoring regions 235.

In the scientific literature, various algorithms and models have been described for identifying animate (alive) objects. As one example, D. Forsyth et al, in the paper *Finding People & Animals by Guided Assembly*, (published in the Conference on Image Processing, pp. 5-8, vol. 3, 1997) describes a method for finding people and animals based on body plans or grouping rules for using basic geometric shapes (cylinders) to identify articulating forms. Body images are segmented into a series of interacting geometrical shapes, and the arrangement of these shapes can be correlated with known body plans. Body shape analysis can be augmented by analyzing the movement characteristics, frequency, and direction of the various articulating limbs, to compare to expected types of motion, so as to distinguish heads from other limbs.

In general, various techniques exist for representing human or animal body shapes, which can be applied to identifying intruding objects 100 as animate and human or animal. Confidence values can be determined from body shape data as to whether an object is a person or animal, or even the type of animal. These techniques basically use body shape models or templates, identifiable to various common forms such as people, cats, dogs, or horses. Inherently, these models lead to localization of candidate head regions 240 in the observed body model 265. These algorithms tend to become more accurate in identifying and tracking body shapes when other data, such as appearance data (color, textures, or features) or motion data are also used.

However, observed animate bodies can be arranged in shapes which are complex and non-obvious, and be further obscured by clothing, hair, or fur. The body shape of person with a blanket draped over their head, and extending to the floor, may be difficult determine. Certainly, under the right circumstances, some body shapes can be confused. For example, a small dog might be classified as a cat. However, for the purposes of the present invention, it is not required that a dog, or a particular type thereof, be properly classified (as a dog, or as a spaniel, for example). Rather, it is required that a body shape be well enough classified to localize candidate head regions 245 with high accuracy. However, correctly identifying an object 100 as a cat (high confidence) instead of a dog can be useful, as cats can move and position themselves differently. Certainly, body shape modeling can be very useful for quickly determining that an object 100 is likely animate (alive) or not (step 575). Body shape modeling can then also be used in locating candidate head regions 245 (step 555).

These complications can reduce the speed, and accuracy of body-shape-based detection algorithms, reducing their effectiveness for real-time applications. Thus, while body shape detection algorithms, which can be part of the obstruction analysis algorithm 365, can be useful in enhancing eye safety for a projector 200, they also are not sufficient, and body shape screening is best used in combination with other techniques. Also, in the case that IR imaging is used, the algorithms would have to be adapted to handle the appearance differences that occur in IR images, as discussed previously.

Screening Using "Person-in-Box" Criteria for Image Searching

As another approach, images can be screened to locate people or animals directly without first finding body shapes.

In particular, the paper *Putting Objects in Perspective*, D. Hoeim et al., published in the IEEE Proc. on Computer Vision and Pattern Recognition (CVPR) 2006, pp. 2137-2144, describes an approach for person detection which is based on knowledge or estimation of the camera viewpoint and estimation of the rough surface geometry in the scene to define the probability of locating a person in a given image location. Once such an algorithm has examined the surrounding context to localize the candidate areas ("person in box") that a person is likely to be in, after which, a person detection algorithm can be run to confirm the person detection. While the Hoeim technique was developed to quickly screen for pedestrians and cars in complicated street view images, the reduced range of geometrical variation in a projection environment 400 would likely aid this algorithm. As with the other techniques, use of IR images would remove the projected image content from consideration. On the other hand, animal targeted image screening is a likely complication, requiring new "pet-in-box" criteria. Generalizing, a "subject-in-box" set of criteria can be developed and used that spans searching for both people and animals, or at least people and common animals such as cats and dogs that have relevant domesticated behaviors. This kind of technique can be used to quickly assess the sensed images to localize likely intruder locations, and then other techniques, such as body shape model analysis (discussed above) or direct head or facial feature screening analysis (discussed below) can refine the analysis. While "subject-in-box" searching does not search for obstructing objects directly, this technique can be included in the obstruction analysis algorithm 365.

Screening for Heads and Faces in Images

In many instances, body shape analyses with IR or visible imaging will quickly and robustly identify the candidate head region 245 of the intruding subject 100 without necessarily there being a need for further analysis. Image difference analysis using visible light images can also localize candidate head regions fairly robustly, but image content and image blanking impact the technique. By comparison, person-in-box analysis (using either visible or IR images) can only localize analysis of sensed image data to image regions where heads and bodies are likely to be found. Because body shapes and positions, as well as human or animal behaviors can be complex, it is desirable to refine or validate analysis of candidate head regions 245, even in the case of a body shape analysis that has high certainty of head localization. Heads can be located in images using a variety of techniques, including analyses using skin color areas, hair appearance, and head, face, or eye based facial features or templates. In the case of the present invention in which eye-safety is a concern, it is not necessary to recognize or identify the intruding subjects 100 by name. In particular, it is a goal of the present invention to locate candidate head regions 245, and then provide head region blanking 240 while tracking movement to head monitoring regions 235.

Figure 6F:
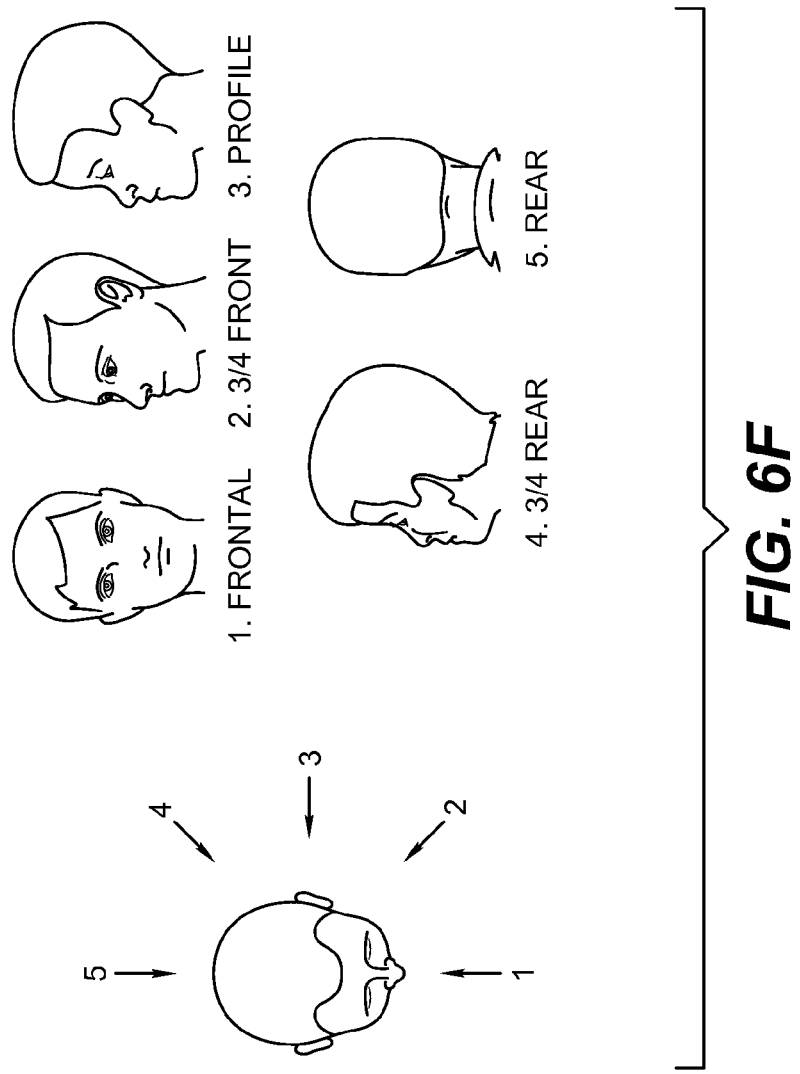
FIG. 6f depicts a range of common human facial poses.

Obviously, the greatest risk related to intense light eye-exposure corresponds to frontal view head poses, rather than side or rear views. However, eye damage can potentially occur for a significant range of side views, ranging between frontal and ¾ frontal poses (see FIG. 6*f*), depending on eye direction. Additionally, head pose can change quickly, pivoting eyes that were previously looking away suddenly towards the projection system. Therefore, it is preferable to use algorithms that quickly and robustly identify head regions, whether eyes 135 are actually detected or not. While sensed images can be searched directly to locate head regions, without first finding likely image regions using body shapes, image differences, or person-in-box analysis, the image analysis time can increase significantly when the entire sensed image must be examined for head or facial details.

As one example, an analytical technique that analyzes images to look directly for nominally circular skin-toned areas can be used. The algorithm can analyze for color data that is common to skin tones for all ethnic groups, thereby reducing statistical confusion from racial, ethnic, or behavioral factors. As an example, the paper *Developing a predictive model of human skin colouring*, by S. D. Cotton (published in the Proceedings of SPIE Vol 2708, pages 814-825, 1996) describes a skin color model that is racially and ethnically insensitive. In the case of sensed visible images, this technique can be used to localize or confirm candidate head regions 245 in image areas previously assessed by the previously discussed image difference, body shape, or person-in-box methods. Again, as this approach uses visible light, the projected image content can confuse this analysis. This problem can be alleviated in the case that projector 200 is a laser based projector, as the three laser spectra, each of which likely has a narrow spectrum (<5 nm), can be removed by filters within the sensing camera, leaving images derived only form the ambient visible light. While this analytical technique can be fast, directional variations in head pose, including poses dominated by hair, can complicate the analysis. Additionally, this technique does not help with animals.

As a possible complement to finding human head regions using skin-tone detection, texture based modeling, such as hair-model screening algorithms can be employed. For example, the paper "*Detection and Analysis of Hair*", by Y. Yacoob and L. David, which was published in IEEE Trans. on PAMI, Vol. 28, pp. 1164-1169, 2006, describes a person-recognition appearance model based on the texture and shape of facial or head hair. For the present invention, which requires detection rather than recognition, an algorithm of this type can presumably be simplified and operable with IR images, as well as visible light images. Significantly, this type of algorithm can be adapted to assist in the detection of animal fur, and may have value in tracking fur color patterns. This method may or may not be particularly useful in distinguishing head fur from fur associated with other body areas. Moreover, texture based models, which key typically on features with high spatial frequency and variable contrast differences, are usually slow algorithms. However, the projection system 200 can also learn to recognize subjects 100 (particularly animals) that have pronounced physical attributes, such as pattern of fur coloring that is easily recognizable. For example, the system 200 can be presented with reference image data for a household pet, or simply see the pet on an ongoing basis, and a model or templates can be developed to enable rapid searching for that pet.

As another alternative to screening or confirming candidate head regions 245, templates or models of head and face geometry can be used. As an example, FIG. 6*e* depicts the facial features used in the Active Shape Model (ASM), which is a facial model useful for recognizing people in images. The ASM, which is a 2D facial model with faces described by a series of facial feature points, was described in the paper "*Active shape models—their training and application*", by T. F. Cootes, C. J. Taylor, D. Cooper, and J. Graham, published in Computer Vision and Image Understanding 61, pp. 38-59, January 1995. The facial active shape model was subsequently expanded to comprise the collection of facial feature points (1-82) depicted in the face point model 90 of FIG. 6*e*. Localized facial features can be described by distances between specific feature points or angles formed by lines connecting sets of specific feature points, or coefficients of projecting the feature points onto principal components that describe the variability in facial appearance. It should be understood that there are a variety of facial recognition modeling approaches that have been developed for enabling the recognition of people in pictures, including the eigen-face model, the active appearance model (AAM), and 3D or composite facial models.

Rather, simplified facial models that support fast face detection algorithms are appropriate here. However, the face point model 90 of FIG. 6e provides a basis for understanding face detection. Many face detection algorithms search for key facial features, such as the eyes (135), mouth (140), and nose (145) that have physical prominence, and can be further accentuated by shadowing. These key facial features can be modeled with a reduced set of facial feature points (8-20 points) or with templates (representing the eyes-nose-mouth) for example. Other templates or simplified facial models based on key prominent features can be used. As one example, searches that look for shadow-highlight-shadow patterns can be used. A horizontally arrayed shadow-highlight-shadow pattern can correspond to how the eye-nose-eye human facial features typically appear in images relative to contrast geometry. In a similar fashion, Dowdall suggests that under IR illumination, templates that model eyebrows and eyes are useful because of the pronounced image contrast. As another example, human faces can also be located and tracked with algorithms that localize to the eyes and mouth.

In practice, many facial detection algorithms can search quickly for prominent facial features, such as eyes, nose, and mouth, without necessarily relying on body localization searches first. However, these algorithms are then prone to false positives, identifying clocks or portions of textured wall surfaces as having the sought facial features. Also most facial detection or facial recognition models, except the 3D composite models, are 2D models that function well in examining frontal (or direct-on) facial images, but which fail at increasing rates as the head pose becomes more and more of a side view (see FIG. 6f). For the present invention, facial detection models that can also find side profile views are particularly useful. Any of these various algorithms for finding heads or faces, as well as others not mentioned, can be aspects of the feature analysis algorithm 370.

As another approach, a search process based on head shape templates can be used to locate and track candidate head regions 245. The head shape templates comprise sets of head and facial outlines for different poses, in which features such as the chin, mouth and lips, nose, eyes, forehead, ears, or hairline become detection attributes. While the set of templates can be fairly large, each involves minimal data. Statistically derived ground truth head shape templates spanning the range of poses can also be used. Accuracy is likely reduced as head poses of an intruding subject 100 have the individual looking at the screen 220 instead of the projector 200, meaning that the back of the head is visible to the camera 310. However, while this is a plausible search approach for humans, the range of pose variations with animals can reduce the value of head shape templates in analyzing their sensed images.

Searching for Eyes in Images

As stated previously, for the purposes of the present invention, which prioritizes locating candidate head regions 245 for image blanking and ongoing monitoring, it may not be necessary to actually locate the eyes 135 on an intruding subject 100. However, locating eyes 135 can be used to validate a prior identification of a candidate head region 245. Additionally, in instances in which confusing images have caused multiple candidate head regions 245 to be identified for an apparent body shape or area, eye detection can clarify the determination, enabling head region blanking 240 and head monitoring regions 235 to be refined.

As eyes 135 are often rather small portions of an image, searching entire images to locate eye features can be time consuming. Thus, the use of prior analyses to localize eye search to likely head regions, using methods such as image difference analysis, body shape analysis, person-in-box analysis, or head localization analysis, can dramatically improve the eye-search success rate. Eye searching can be performed using the associated facial feature points (points 1-22) of the face point model 90 (FIG. 6e). However, that approach involves more detail (finding the iris, pupil, eye corners, for face recognition tasks) and search time than is preferred for the present invention.

Alternately, algorithms can perform image search tasks for eye features using eye-specific deformable templates, such as suggested in the paper "*Feature extraction from faces using deformable templates*", by A. L. Yuille, P. W. Hallinan, and David S. Cohen, published in International Journal of Computer Vision, Vol. 8, pp. 99-111, 1992. The deformable templates can describe the generalized size, shape, and spacing of the eyes. Although the methods of searching images for eyes using eye templates is faster than searching for eyes features using the face point model, both methods are slower than searching using facial templates, and add uncertain value for this application. Additionally, neither method is likely to work quite as well with pets as they do with humans.

On the other hand, screening for eye-shine from common pets such as cats and dogs has significant potential utility for the present invention beyond just validation of candidate head regions 245. While eye-shine is angularly sensitive, and eye damage could occur without eye-shine being visible, in the circumstances of greatest risk in which a pet stares back at the projector, eye-shine can be highly visible. Due to the high brightness or high contrast of the eye-shine eyes relative to the surround, it can be easier and quicker to find eyes exhibiting eye-shine than to search for candidate head regions first. In such circumstances, eye-safety can be enabled by detecting eye-shine eyes in the image, and then blanking image projection with margin around the area the eyes reside in. However, other screening methods such as body-shape or head region detection still should be used, as the pet's head may tilt somewhat, eliminating the eye-shine signal while still allowing unsafe laser exposure. Any of these various eye-region or eye-specific search techniques can be included in the feature analysis algorithm 370. Additionally, it is noted that once eyes are located, and eye-tracking algorithm can be used to follow the subject eye motion, as an alternative to tracking heads or faces. In general, eye tracking is often used to monitor eye gaze, but in this instance, eye location is fundamentally more important.

Image-Based Searching Summary

As is now evident, each of the potential screening methods reviewed above for examining sensed images to determine animate subjects 100 and candidate head regions 245 thereon, has both advantages and short-comings relative to the robustness of its feature extraction analysis for this application. In considering these various methods, which are summarized in Table 1, it is evident that none of them are sufficiently accurate, fast, and versatile enough to provide the required image analysis for this application. Rather, for the purpose of guaranteeing eye safety during the operation of a projection system 200, while following a head-centric approach for image blanking and intruder monitoring, the present invention anticipates that multiple image analysis methods, including some of those listed below, will be needed to extract the salient features from the sensed images.

TABLE 1

Camera Based Sensing

| Search target | Search Method | Light | Advantages | Disadvantages |
|---|---|---|---|---|
| Body areas | Image differences | Visible | Speed & robustness | Confusion with projected image & adjacent image content, reduced signal during blanking |
| Body areas | Shadows | Visible, IR | Speed, high contrast images to process | Camera & light source placement, indistinct body shapes, projected content confusion (visible) |
| Body areas | Torsos or body shapes, body models | Visible, IR | Directly finds silhouettes and head regions, identifying animate objects, can use motion data | Speed, body shape complexity & variation, sensitivity to obscuration |
| Body areas | Person-in-box | Visible, IR | Speed | Indirect, uncertain adaptability for home behaviors and pets |
| Heads/faces | Skin areas | Visible | Speed | Humans - pose & hair sensitivity, confusion with projected image, not applicable for pets |
| Heads/faces | Hair | Visible, IR | May help reduce pose sensitivity and with animals | Speed, pose sensitivity |
| Heads/faces | Facial features/face models & templates | Visible, IR | Speed (for template models) | Potential for false positives, pose sensitivity, adaptability to pets |
| Heads/faces | Head shape templates | Visible, IR | Speed | Pose sensitivity, adaptability to pets |
| Eyes | Eye features (face points, templates, highlight-shadow) | Visible, IR | Locates eyes directly | Speed (depends on method), pose sensitivity, adaptability to pets |
| Eyes | Eye-shine | Visible, IR ? | Speed in locating eyes for common pets | Pose sensitivity |

As an example, it appears that at least two image analysis methods are required to reliably localize animate bodies in the sensed images. For example, if the sensors 305 provided with projector 200 include only IR sensitive cameras, and not visible light sensitive cameras, then both body-shape and person-in-box analyses can be used concurrently. On the other hand, if the sensors 305 include both IR and visible spectrum cameras, then both image difference and body-shape analysis can be used concurrently. Ideally, to reduce computational requirements, localization of body shapes would require only one image analysis search and feature extraction analysis method, which would preferably be body-shape analysis, as it leads directly to the fundamental information (identification of head regions 245) that is sought.

The sensed image data, and particularly the localized body areas therein, can then also be analyzed to localize candidate head regions 245 and head monitoring regions 235 therein. Again, one or more of the described methods for localizing heads and faces that are listed in Table 1 can be used, depending on whether the sensing cameras distinguish visible light, IR light, or both. For the present invention, relative to screening for humans intruding in the projected light beam 210, an image search approach based on head shape templates or prominent facial feature templates that locate eyes or nose or mouth (or eyebrows) for example can work, and likely provide the most benefit if they are used concurrently. Whereas, in searching for common pets intruding in the projected light beam 210, an image search approach based on head shape templates (or head features) and eye shine can provide substantial benefits if used concurrently. In each case (humans or pets), at least one of the preferred methods for localizing heads, faces, or eyes, is nominally used in combination with at least one method for localizing animate bodies, as the combination enhances robustness and reduces computation time.

In the prior discussions, detection of animals has largely focused on cats and dogs, which are the most common residential pets. As cats and dogs are natively nocturnal hunting animals, they both have a tapetum lucidum in each eye that can provide eye shine in an advantageous fashion for this invention. However, other residential pets that can find their way into the light beam 210 may not provide eye shine, and their eyes may be otherwise hard to locate. In such cases, image interpretation may be limited to body shape analysis or head shape analysis, and in the former case, refined image blanking may stop at silhouette blanking 230.

In summary, for the purposes of providing eye safety for a projection system, the present invention anticipates that head or face targeted intelligent sensing will analyze image data with a combination of image interpretation methods so as to localize body positions and head or face regions thereon. In particular, multiple analytical techniques will be used for locating both animate bodies and the heads (or faces) thereon. As image interpretation technologies improves, the performance of the analytical methods described above may improve, or new analytical approaches or algorithms may emerge. Additionally, appropriate algorithms can be optimized, combined, or developed with this particular application in mind. More generally it should be understood that computer 315, within projection system 200, includes an intelligent agent or artificial intelligence (AI) or set of algorithms that adaptively respond or anticipates object motion, and modifies the image blanking accordingly. This intelligent agent can also be a learning system that progressively gains understanding of user activities and communication needs.

For the purposes of this invention, animate objects have been defined as objects such as people or animals that are alive. For example, as shown in FIG. 5g, two objects 100a and 100b are intruding into the projected image 215. Object classification, for example using images and body shape analysis, can classify object 100b as a cat, and initiate head region blanking 240. Object 100a can be classified as an inanimate (not alive) object, and the projected image can be allowed to impinge on it.

Figure 5H:
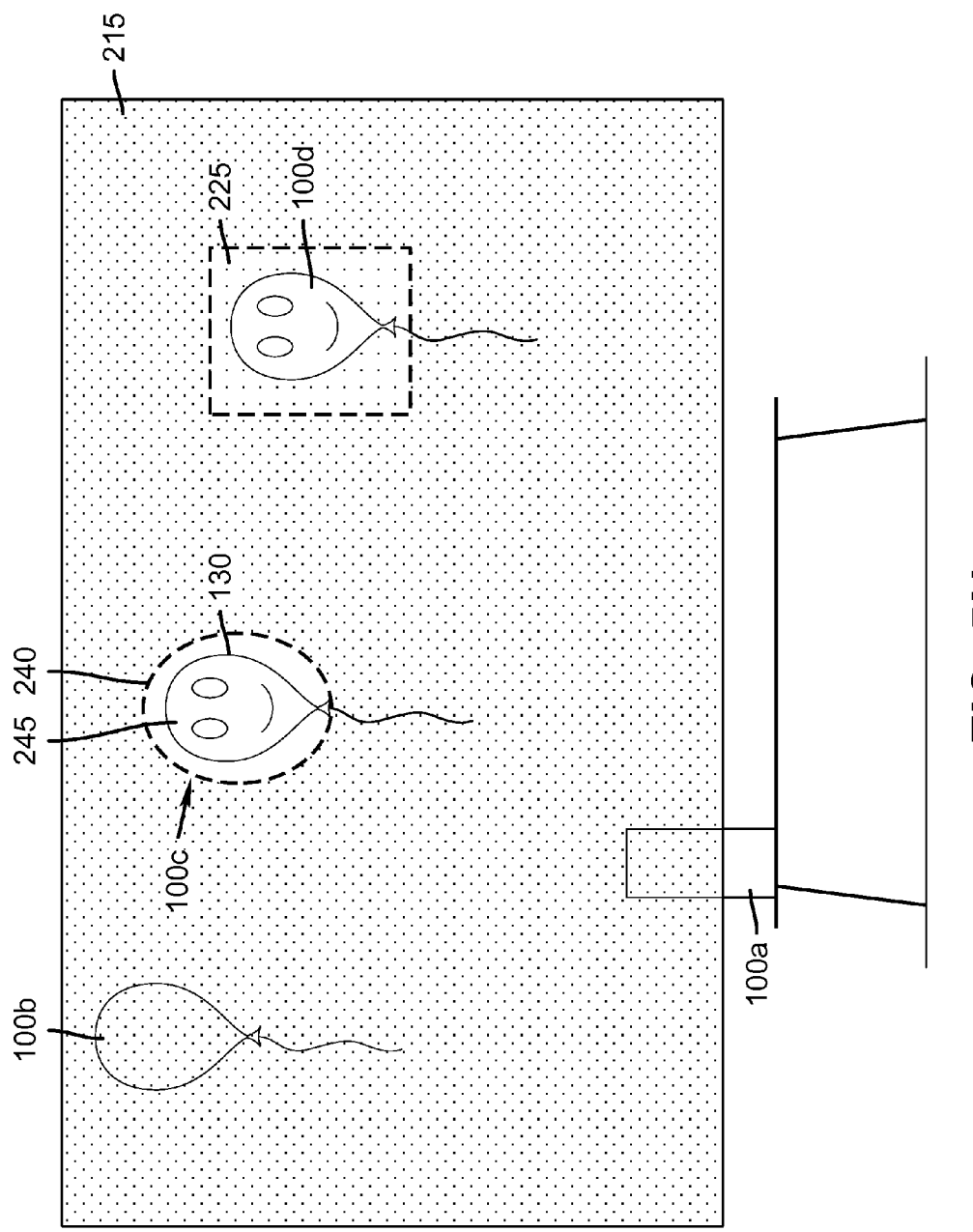

However, by dictionary definitions, animate objects are also commonly defined as non-alive objects that are moving. In a residential environment, such common objects can include a remote control car or a floating balloon. Certainly, such objects can provide a challenge to a projector 200 that is equipped with intelligent sensing as described in the present invention. In particular, FIG. 5h depicts several examples in which an intruding object 100 is a moving non-alive object. Object 100b is a floating balloon on which the projected image 215 is being allowed to impinge. Object 100c is a floating balloon that has a face 130 illustrated on it, and for which the image analysis algorithms of the present invention can identify a candidate head region 245 and head region blanking 240. Confusing circumstances such as the balloon with a face 130 can result in no image blanking (like object 100b), head region blanking 240 (like object 100c), or oversized image blanking 225.

In the case of people or animals, image analysis algorithms can often correctly identify an object 100 as an animate object. Object motion data, provided by motion analysis algorithm 375, including motion tracking data, motion frequency data, or characteristic motion data (such as movement or articulating limbs) can all aid a successful determination. Thus object motion data and analysis can complement the feature-based image analysis approaches by providing supporting data. Alternately, analysis of object motion data can potentially detect and locate a human or animal based on characteristic motion data more quickly than does feature based analysis. Thus initial image blanking can be triggered by motion analysis. However, as examples, the presence of an object 100 that is a manikin, a life-like robot, a stuffed animal, or a floating balloon with a face displayed on it, conceivably may confuse the system 200, leading to false positives. Motion detection data and interpretation may not resolve the uncertainties quickly. In particular, a person or animal, positioned in a difficult pose to interpret, may stare at the projector 200, while remaining sufficiently stationary, that a false negative occurs. As a result, some computational resources that can be used for defining or providing candidate head regions 245, head monitoring regions 235, or head blanking regions 240 are otherwise occupied. Thus the use of use of sensing technologies that directly identify an object as animate (alive) or inanimate (not-alive, whether moving or stationary) can prevent the confusion represented by the floating balloon with a face on it, or other comparable objects. It is noted that thermal IR imaging, which utilizes the fact that people and animals are ~300K blackbody sources, can also be used to detect whether an object is animate or inanimate, provided that the ambient temperature of neighboring inanimate objects is sufficiently below 300K. However, most thermal cameras (310) are presently too expensive for consumer applications.

Image Projection Calibration and Intruding Objects

It is also noted that when a laser projector 200 is first turned on, it typically needs to be calibrated. This can be done using a camera 310 which first locates the edges of the projected image 215 on the screen 220, followed by remapping of the camera pixels to the image projector pixels and then determining relative light levels of each pixel for a uniform illumination levels and adjusting them accordingly to obtain a uniform response function over the entire screen area. In order to maintain safe conditions during calibration, the first projected image can be provided at a low light level that is eye safe. In the case that no obstruction is detected in the screen area of the image there is no problem and the light intensity could be increased safely for calibration while detecting for an obstruction coming into the beam area.

In an instance when there is an obstructing object 100, whether animate or inanimate, within the screen area, there is still a need to calibrate. The reflected light from an object 100 that is occluding the light beam 210 will in general be different from that reflecting off of the projection screen 220 and deviations from the mean value can be used to determine locations of the blocking object 100. As a comparison, projection errors that provide calibration differences can be expected to be relatively small between multiple adjacent pixels, and they will tend to have the same localized mean value, whereas the detected reflected signals from obstructing objects 100 will be distinct from the expected mean value. Thus extended areas of large deviation from the mean can be used to indicate obstructions, and data from these regions need not be used for calibrating the projector 200. Rather the data used for calibration in the obstructed area of the display can be calculated from mean of the region in the external vicinity of the obstruction. In the case of a moving animate object 100, when the object 100 moves to a new location, the vacated regions can now be calibrated as before.

If the camera 310 is being used for both calibration and obstruction detection at turn on, the camera exposure times need to be short enough that obstruction detection can occur while avoiding the possibility of eye damage. Calibration images can be acquired during multiple short exposures, and then combined to provide the calibration data for adjusting individual display pixel light levels.

In the special case of a line scanned system, such as a GLV based projector 200, as described in U.S. Pat. No. 7,144,117 by Kojima et al., or a GEMS based system 200 described in commonly assigned U.S. Pat. No. 6,422,425 by Kowarz et al., there is a one dimensional modulator array (334) of illuminated pixels which are pulse width modulated, while image light beams 210 are scanned across the screen 220 in the perpendicular direction. In this case, each pixel can still be calibrated when an obstruction is present by using the data from the non-obstructed regions corresponding to that pixel.

Searching for Intruders into the Projection Path Using Non-Optical Sensing

As noted previously, the projection system 200 of the present invention can be equipped not only with cameras 310, but one or more sensors 305 that provide non-camera type sensing. In that case, computer 315 also provides appropriate data processing beyond just image analysis and processing 360 to analyze this data. As with the imaging technologies, non-optical imaging technologies that enable quick detection and localization of animate objects, and perhaps candidate head regions 245 thereon, are particularly valuable. As first such examples of a non-imaging alternate sensor 305, microwave, ultrasound, or acoustic (voice) sensing can be used.

In particular, motion-detection monostatic microwave sensors, which provide both the transmitter and receiver, can be tuned to measure the Doppler shift for the frequency range of 20-120 Hz, in which human movement generally falls. For example, Doppler microwave sensors working at 24 GHz CW can also be used to detect moving objects 100. Objects that fail to produce signals outside these ranges can potentially be ignored.

Pulse echo ultrasound can also be used to detect obstructing objects 100 and to determine their distance from the source (at projector 200). Doppler motion detectors rely on the mechanism that a moving reflector (object 100) causes a phase difference between the transmitted and the received reflected signal. These detectors can be used in a continuous wave mode. Ultrasonic waves can be readily transmitted through air in the 40-60 kHz frequency range. A combination of CW and pulse echo can be used to determine if there is an obstructing object 100, as well as its distance from the source, and then if it is moving.

In order to appropriately use these technologies for screen blanking or region blanking we desire to minimize false positives as well as false negatives. For example, Doppler and ultrasound can be used simultaneously to improve sensitivity and reduce false alarms. An example of combining microwave and ultrasonic sensors for motion detection is described in the paper "*Highly sensitive motion detection with a combined microwave-ultrasonic sensor*", by H. Ruser and V. Magori, published in Sensors and Actuators, Vol A 67 p 125-132, 1998. In the domestic environment 400, moving inanimate objects 100, such as curtains moved by room fans or a moving remote control car, can cause false positives for Doppler-based motion detection schemes. Thus, it can still be desirable to combine microwave and/or ultrasound sensing with imaging based sensing or other sensing modalities. Combining two or more of these technologies in a sensing system and using an AND gate can help reduce false positives.

Figure 7:
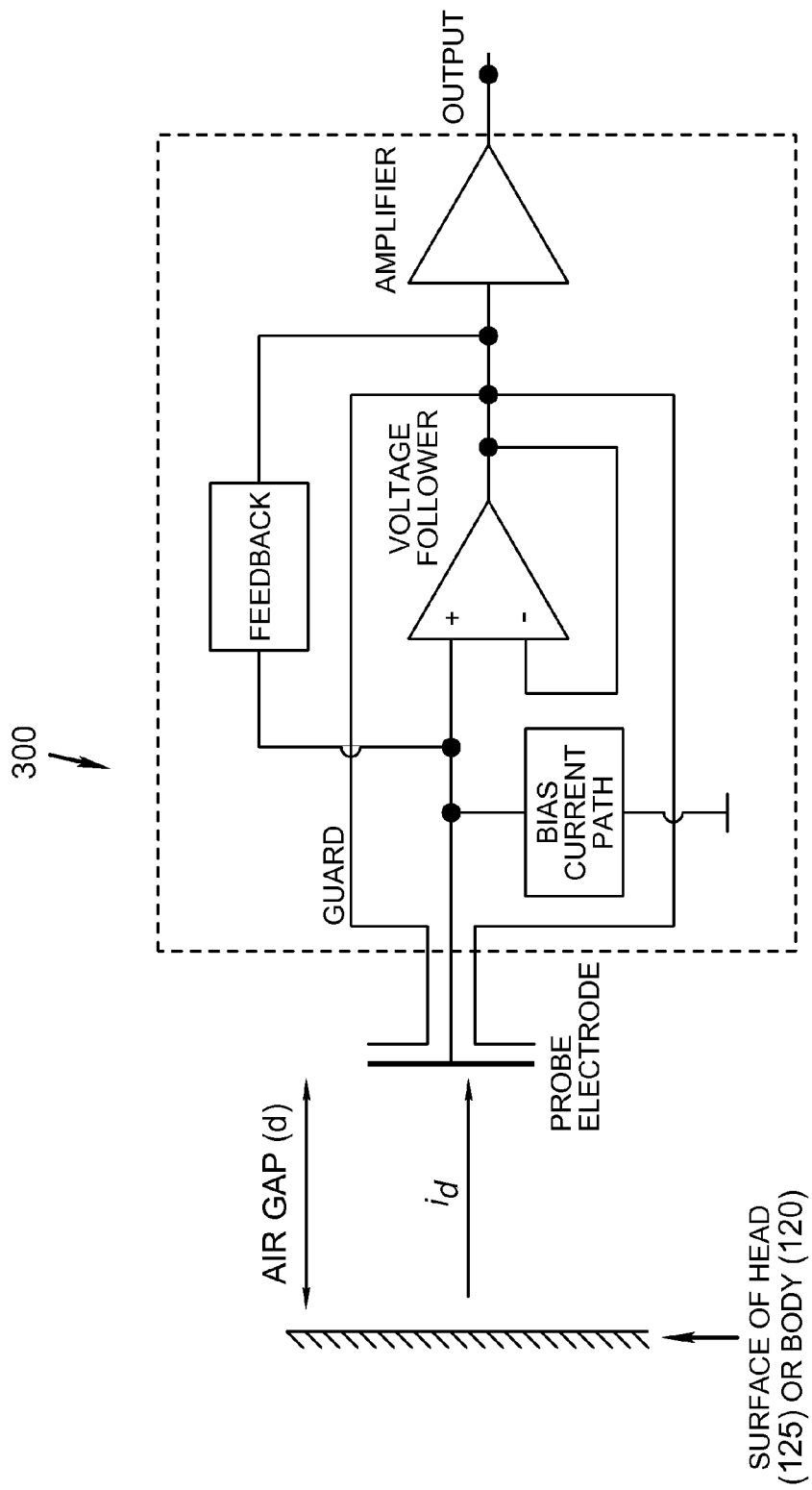
FIG. 7 depicts a prior art sensor for detecting bio-electric fields.

As another example of an alternate sensing technology for detecting animate (alive) objects, US Patent publication 20060058694, by T D Clark and R J Prance, describes a non-contact bio-sensing technology (a bio-field electric potential sensor) capable of detecting bio-electric fields at distances (d) of several meters. FIG. 7 depicts a block diagram of a typical electric potential sensor 300 showing the probe electrode and the feedback, guard and input bias circuits of the electrometer amplifier. This electro-dynamic sensor (300) measures a displacement current $i_d$, which is actually a rate of change of voltage measurement, with a high impedance circuit. The device conceptually acts as a perfect voltmeter that is able to measure very low, bioelectric potentials, including various bio-electric signals such as ECGs, EEGs and EOGs. The ECG (electrocardiogram) type signal is ~40× stronger than the EEG (electroencephalogram), but as the EEG measures electrical activity in the brain, it can be useful for locating heads. The EOG (electro-oculogram) is also a weak signal that measures the resting potential of the retina, while being sensitive to both eye blink and eye motion. As with the EEG, a direct measurement of EOG signals can likewise be useful for locating eyes for the present application.

In the case of the present application, multiple bio-electric field sensors, of the type of FIG. 7 or equivalent, can be used to localize animate objects within a space. For example, depending on the signal strength, ECG signals can be used to first localize body position, and then EEG or EOG signals, to localize head positions. For this type of application, it is not necessary to attain medical quality signals supportive of diagnostic analysis, but lesser quality signal sufficient to localize and distinguish such signals from multiples sources (objects 100) would suffice. The resulting data can be used in combination with image-based detection to determine if an intruding object 100 is animate or not, thereby reducing false positives or uncertain results (object 100 is a stuffed animal). A bio-electric field sensing technology can also be used to directly detect and locate heads. This can help projection system 200 locate candidate head regions 245 more quickly, or potentially confirm image-based results that located a head, thereby improving confidence levels in that determination. However, unlike imaging technologies, head size information, and therefore the size of head region blanking 240, may not be determined directly by this type of technology. Thus the combination of bio-electric field sensors and imaging devices can provide a very effective combination to identify animate objects quickly and robustly, and then derived the needed shape and sizing information. If image-based data is not available, other sizing data or metrics may be required. It is noted that bio-magnetic field sensing (or more generally, bio-electromagentic field sensing) can also be used for the purpose of animate object detection.

The invention has been described in detail with particular reference to certain preferred embodiments thereof, but it will be understood that variations and modifications can be effected within the spirit and scope of the invention. It is emphasized that the apparatus or methods described herein can be embodied in a number of different types of systems, using a wide variety of types of supporting hardware and software. In particular, the projection system 200 has been described as using one or more image analysis algorithms, and specifically a variety of obstruction analysis (365) and feature extraction (370) algorithms, to locate subjects 100 within a monitored area 355 who can obstruct at least portions of the projecting light beam 210. The interaction and application of these system and the supporting algorithms has been described by a series of operational diagrams (FIGS. 3*a*-*b* and FIG. 4). However, other equivalent methods, mechanisms, and operational interactions, including changes in the order thereof, can be used to accomplish the claimed functionality. It should also be noted that drawings are not drawn to scale, but are illustrative of key components and principles used in these embodiments.

What is claimed is:

1. A method for providing improved eye safety while operating an image projection system, comprising:
   a. operating an image projection system that generates a modulated light beam which forms images on a display surface;
   b. monitoring an area in front of the display surface, and at least inclusive of the display surface, with an image capture device;
   c. analyzing images acquired by an image capture device to locate subjects that can obstruct a portion of the modulated light beam prior to the display surface, the image analysis including feature extraction analysis of the images of the subjects to identify candidate head regions therein, and the image analysis further including motion analysis to track motion of the subjects;
   d. determining a head blanking region and one or more associated head monitoring regions for a candidate head region associated with a subject, the head monitoring regions being determined using the motion analysis and corresponding to image areas where a head blanking region is likely to be in a subsequent time as the subject moves;
   e. blanking image projection to at least the head blanking region by substantially reducing the light levels of the modulated light beam provided to the head blanking region;
   f. prioritizing ongoing image analysis to the associated head monitoring regions to determine new head positions as the subject moves such that more computing capacity is devoted to analyzing image data in the head monitoring regions than to analyzing image data in other image areas; and
   g. modifying head region image blanking to track and overlap the new head positions.

2. The method according to claim 1, wherein the image analysis utilizes at least one of body shape analysis, image difference analysis, shadow image analysis, subject-in-box analysis, or motion analysis, or combinations thereof, as search techniques for locating subjects in the monitored area.

3. The method according to claim 1, wherein the feature extraction analysis utilizes one or more methods for locating candidate head regions, including body shape analysis, head shape analysis, skin area analysis, facial feature analysis, or eye-shine analysis, either individually or in combination.

4. The method according to claim 1, wherein an initial image blanking region is provided using an expanded image blanking region determined by expanding the determined head blanking region, the initial image blanking region being substantially larger than the determined head blanking region, and wherein the initial image blanking region is used to blank image projection for an initial time period.

5. The method according to claim 4, wherein the process of determining the expanded initial image blanking region includes silhouette blanking or expanded torso area blanking.

6. The method according to claim 1, wherein the head monitoring region has an associated size, position and movement, the size, position and movement of the head monitoring region being determined responsive to size, motion and activities determined for the corresponding subject.

7. The method according to claim 1, wherein the size of the head blanking region depends on the subject's motion.

8. The method according to a claim 1, wherein the subject is a person or an animal.

9. The method according to claim 1, wherein the monitored area is monitored using an image capture device or with a sensing device other than an image capture device prior to a modulated image display light beam being provided to the display surface.

10. The method according to claim 1, wherein an image capture device is an infrared (IR) imaging camera.

11. The method according to claim 1, wherein the monitored area is further monitored with sensing devices other than image capture devices, those sensing devices including sensors that can distinguish between animate subjects and inanimate objects that are within the monitored area.

12. The method according to claim 11, wherein the sensing devices include at least one of a monostatic microwave sensor or a non-contact bio-electric field sensor.

13. The method according to claim 11, wherein image blanking is removed for objects that are identified as inanimate.

14. A method for providing improved eye safety while operating an image projection system, comprising:
   a. operating an image projection system that generates a modulated light beam which forms images on a display surface;
   b. monitoring an area in front of the display surface, and at least inclusive of the display surface, with at least one image capture device;
   c. analyzing images acquired by an image capture device to locate subjects that can obstruct a portion of the modulated light beam prior to the display surface;
   d. analyzing the images of the located subjects to locate subject bodies or head features, thereby identifying candidate head regions on the subjects;
   e. determining a head blanking region and one or more associated head monitoring regions for a candidate head region associated with a subject, the head monitoring regions being determined using the motion analysis and corresponding to image areas where a head blanking region is likely to be in a subsequent time as the subject moves;
   f. blanking image projection to the head blanking regions by substantially reducing the light levels of the modulated light beam provided to the head blanking regions;
   g. prioritizing ongoing image analysis to the associated head monitoring regions to determine new head positions as the subject moves such that more computing capacity is devoted to analyzing image data in the head monitoring regions than to analyzing image data in other image areas; and
   h. validating identification of candidate head regions and associated head blanking regions based on further image analysis, and continuing image blanking for positively identified head regions, and ending image blanking for invalidated head regions.

15. The method according to claim 14, wherein the image analysis utilizes body shape analysis, image difference analysis, shadow image analysis, subject-in-box analysis, motion analysis, or combinations thereof, as search techniques for locating subjects in the monitored area.

16. The method according to claim 14 wherein the method utilizes body shape analysis, head shape analysis, skin area analysis, facial feature analysis, or eye-shine analysis, either individually or in combination, to locate head features.

17. A method for providing improved eye safety while operating an image projection system, comprising:
   a. operating an image projection system that generates a modulated light beam which forms images on a display surface;
   b. monitoring an area in front of the display surface, and at least inclusive of the display surface, with at least one sensing device;
   c. analyzing data collected by a sensing device to locate objects that can obstruct a portion of the modulated light beam prior to the display surface;
   d. further analyzing data related to the objects to determine whether the objects are animate or inanimate;
   e. blanking image projection to at least portions of an identified animate object, while allowing image projection to identified inanimate objects;
   wherein the sensing device is a visible imaging camera used for calibration of the image projection system and the image analysis in step c further comprises analyzing the deviations in the mean value of light reflecting off the display surface and looking for extended regions where the deviations are significantly larger than other regions indicative of an obstructing object in the light beam.

18. The method according to claim 17, wherein the sensing devices comprises at least one of the following; an image capture device, a monostatic microwave sensor, or a non-contact bio-electric field sensor, or combinations thereof.

19. The method according to claim 17, wherein sensing of an identified animate object is done using an image capture device, and subsequent image analysis of the acquired images provides identification of candidate head regions on the identified animate object.

20. The method according to claim 19, wherein a head blanking region and associated head monitoring regions are determined for a candidate head region associated with the object.

21. The method according to claim 19, wherein image projection to the head blanking region is blanked by substantially reducing the light levels of the modulated light beam provided to the head blanking region.

22. The method according to claim 19, wherein ongoing image analysis is prioritized to identified head monitoring regions to determine new head positions as the object moves in the monitored area.

23. A laser projection system providing improved eye safety, comprising:
   a. a laser light source which provides a light beam;
   b. a light modulation means which imparts image data to provide a modulated light beam;
   c. a projection lens which forms an image on a display surface with the modulated light beam;
   d. at least one camera directed for image capture of a monitored area including the display surface;

e. obstruction analysis means to assess the monitored area to locate objects that can intercept a portion of the modulated light beam prior to the display surface;
f. feature extraction analysis means to assess images of obstructing objects to determine head characteristic features and to identify candidate head regions thereon; and
g. motion analysis means to assess the motion of the obstructing objects;

wherein the candidate head regions are analyzed relative to motion and head characteristic features to determine both head blanking regions and head monitoring regions, the head monitoring regions being determined using the motion analysis and corresponding to image areas where a head blanking region is likely to be in a subsequent time as the subject moves, such that portions of the modulated light beam that are directed to at least the head blanking regions are blanked by the projection system, while the projection system uses the defined head monitoring regions to track and modify head region image blanking relative to object movement such that more computing power is devoted to analyzing image data in the head monitoring regions than to analyzing image data in other image areas.

24. The method according to claim 1, further including using further image analysis to validate or invalidate one or more of the identified candidate head regions and associated head blanking regions.

25. The method according to claim 24, further including the continuation of image blanking for validated head regions, and the ending of image blanking for at least one invalidated head region.

26. The method according to claim 14, further including monitoring the monitored area using one or more sensing devices that can distinguish between animate and inanimate objects, wherein the one or more sensing devices include a monostatic micro-wave sensor or a non-contact bio-electric field sensor.

* * * * *